US005613069A

United States Patent [19]
Walker

[11] Patent Number: 5,613,069
[45] Date of Patent: Mar. 18, 1997

[54] NON-BLOCKING PACKET SWITCHING NETWORK WITH DYNAMIC ROUTING CODES HAVING INCOMING PACKETS DIVERTED AND TEMPORARILY STORED IN PROCESSOR INPUTS WHEN NETWORK OUPUT IS NOT AVAILABLE

[75] Inventor: Tony Walker, 7316 Flewellyn Road, Stittsville, Ontario, Canada, K2S 1B6

[73] Assignee: Tony Walker, Stittsville, Canada

[21] Appl. No.: 357,335

[22] Filed: Dec. 16, 1994

[51] Int. Cl.$^6$ ............................ G06F 13/00; G06F 13/14
[52] U.S. Cl. ................... 395/200.15; 395/200.02; 395/858; 395/182.02; 370/355; 370/400
[58] Field of Search ................ 370/54, 16, 60, 370/63, 94.3; 395/200.15, 200.02, 858, 182.02; 359/121

[56] References Cited

U.S. PATENT DOCUMENTS

| 4,450,554 | 5/1984 | Steensma et al. | 359/121 |
|---|---|---|---|
| 4,701,907 | 10/1987 | Collins | 370/63 |
| 4,945,471 | 7/1990 | Neches | 395/200.06 |
| 5,022,025 | 6/1991 | Urushidani et al. | 370/60 |
| 5,088,091 | 2/1992 | Schroeder et al. | 370/94.3 |
| 5,111,198 | 5/1992 | Kuszmaul | 340/825.52 |
| 5,425,021 | 6/1995 | Derby et al. | 370/54 |

FOREIGN PATENT DOCUMENTS 0355797 of 1990 European Pat. Off. .

OTHER PUBLICATIONS

Computer Communications Review, vol. 7, No. 1. Jan. 1977, New York US pp. 29–33, XP002001217 C.A. Sunshine "Source routing in computer networks", see p. 30, line 27—p. 31, line 29, see Figure 1.

IEEE Journal On Selected Areas In Communication vol. 9 No. 8, Oct. 1991, New York US, pp. 1289–1298, XP000267580 J.N. Giacopelli et al: "Sunshine: a high–performance self–routing broadband packet switch architecture" see para II.B; para IV; para V.B; see Figure 1.

International Zurich Seminar On Digital Communications Mar. 1986, CH, pp. 25–32, XP000130171, J.S. Turner: "New directions in communications (or which way to the information age?", see para 3.1; see Figure 5.

International Conference On communications, vol. 3, Jun. 1991, USA, pp. 1575–1581, XP000277582 K.J. Schrodi et al: "Dynamic connection rearrangements in ATM Switching networks" see para 3.5; see Figure 6.

Primary Examiner—Thomas C. Lee
Assistant Examiner—Le Hien Luu
Attorney, Agent, or Firm—Marks & Clerk

[57] ABSTRACT

A data transmission network comprises a plurality of packet switches distributed throughout the network for transmitting data between a data source and destination. The destination of the incoming data is identified and a path created through the network to said destination based on the destination. The incoming data are assembled into packets. In the packets are included a plurality of routing codes defining the path through successive switches in the network. The packet switches for interpret the routing codes in the received packets and route the packets to the next switch until the destination is reached.

22 Claims, 9 Drawing Sheets

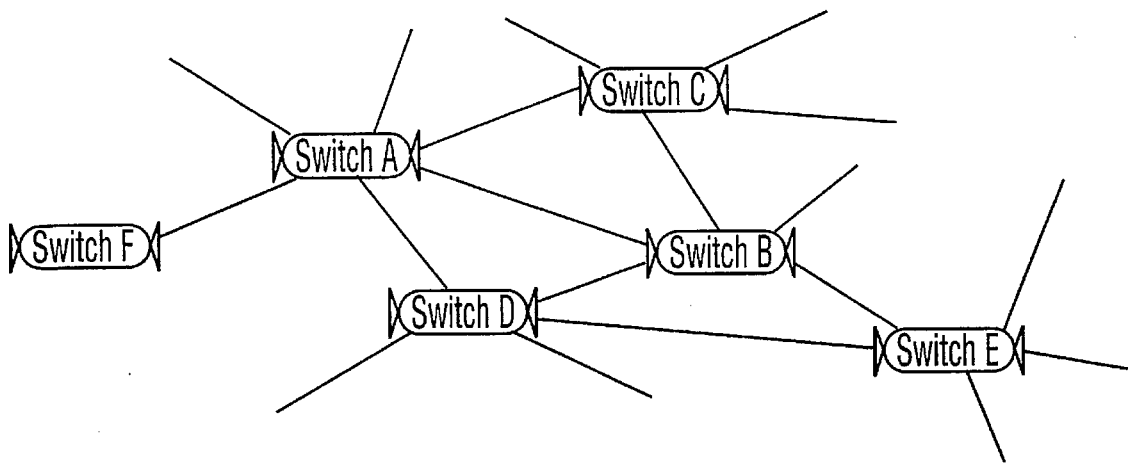
FIG. 15
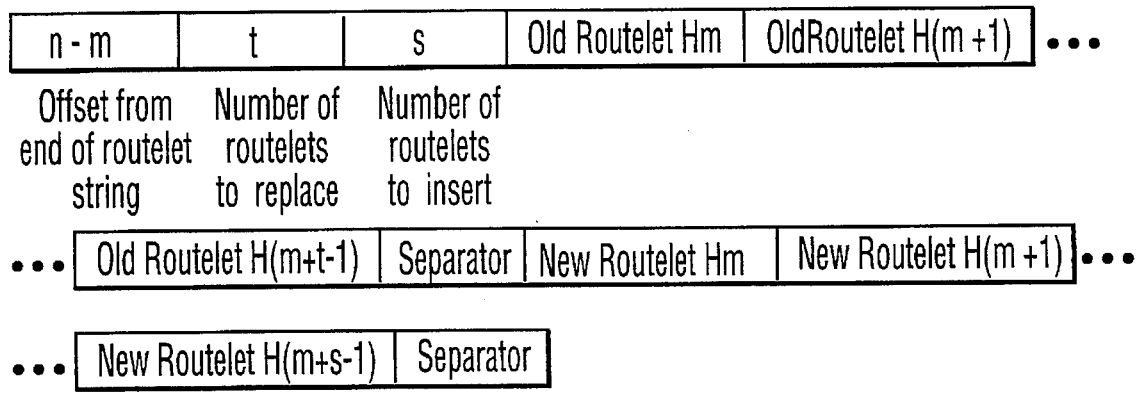
FIG. 16
FIG. 17

The conversion process.

The packetized data stream- output from pad

NON-BLOCKING PACKET SWITCHING NETWORK WITH DYNAMIC ROUTING CODES HAVING INCOMING PACKETS DIVERTED AND TEMPORARILY STORED IN PROCESSOR INPUTS WHEN NETWORK OUPUT IS NOT AVAILABLE

BACKGROUND OF THE INVENTION

1. Field of the Invention

This invention relates to a method of operating a packet switched data communications network.

The method provides the means by which packet data can be routed through a switched packet network at speeds several orders of magnitude higher than is possible with current technology. This method enables the implementation of high speed wide area networks capable of transmitting voice, video and data on a single network. The method reduces significantly the complexity of managing the routing of packets through a switched network.

The method is primarily applicable to large (national and international) telecommunications networks and to large private networks.

2. Description of the Prior Art

From the perspective of switching technology, there are currently three major classes of network:

Firstly, there are switched point-to-point networks, typified by the world's Public Switched Telephone Networks (PSTNs). Ignoring the residual analog subsets, these networks consist of digital point-to-point links connecting digital switching nodes (switches) and end users together.

The PSTNs are characterized by the way in which they connect end users by setting up a dedicated path through the network for the duration of a connection, by their transmission of continuous unstructured bit streams, and by the relatively low bandwidth of each connection, 64 kb/s. Permanent (dedicated) circuits can be provided by wiring a permanent path through the network, and multiple parallel permanent circuits can be used to provide higher bandwidth.

These networks provide fast transmission, with minimal switching delays. On the other hand, they make poor use of the available bandwidth, as a physical circuit is dedicated to each conversation and spare capacity in the circuit cannot be re-allocated to other users. As an example, in a typical telephone conversation only one person is speaking at any time, so at least half the capacity is unused at such times. Couple this with the fact that present technology can compress the conversation into a bit stream of less than 32 kb/s without any loss of quality, and it will become apparent that the PSTNs are very wasteful of the available capacity.

The switched point-to-point networks provide no error detection or correction capabilities, as the occasional bit error has no effect on voice transmissions.

Finally, while the PSTNs can carry voice with capacity to spare, their fixed link speed of 64 kb/s makes them unusable for signals such as video that require much higher capacity circuits.

Secondly, there are packet switching networks. Like the PSTNs, these are usually wide area networks (and usually piggy-back on top of a PSTN using dedicated circuits to connect the packet switches). The topology of a packet switched network is similar to that of a switched point to point network. The distinction is made by the traffic and switching technique. Rather than carrying raw continuous bit streams, these networks carry packets and the switching nodes route data on a packet by packet basis. This technique permits traffic to share the physical path(s) between nodes, and is well suited the bursty traffic that is typical of computer systems.

Packet switching systems provide 'virtual circuits'. A path through the system is set up for a call, but no capacity is reserved. Many virtual circuits can therefore share physical links in the network. When a packet is received at a switching node, it is read by the processor at each node and routed based on a virtual circuit id. contained in the packet header.

Packet switching technology provides for the detection and correction of errors in the data. This is necessary for most computer applications, but is not needed for voice and data systems, where the occasional bit error has no discernible affect on the received signal.

The packet switch networks are (theoretically, at least) capable of carrying much higher speed traffic. However, they suffer from relatively long and unpredictable end-to-end transmission times (in the order of hundreds of milliseconds for older technologies such as X.25). While they are adequate for computer traffic, these switching delays make them unusable for voice and video.

Finally, there are the bus networks. These are typically local area networks using a single bus or loop that carries packet data at high speed (10 Mb/s to 100 Mb/s or more), to which a number of computers are attached. There is no switching as such. All the computer systems transmit on the bus, listen to the bus, and extract the packets addressed to themselves. Larger systems are made up of multiple networks connected by various types of bridges and routers, but none of these systems is capable of expansion to a wide area network with the scope and connections of a PSTN. Like the wide area packet networks, these systems suffer from switching induced transmission delays when multiple networks are involved.

The data transmitted among computers is typified by bursts of data with intervening periods without data. Such systems therefore do not make effective use of point-to-point switched networks.

Almost all computer applications require error-free transmission, which means that the detection of errors and re-transmission of data are mandatory.

On the other hand, most applications can tolerate significant delays in the delivery of data and can tolerate significant variation in transmission delays.

In contrast to computer data, digitized voice and video communications systems typically have opposite requirements. They generate a continuous stream of data which must be delivered quickly and regularly. When packetized, transmission delays must not vary by more than a few milliseconds. Data which is not delivered on time is useless and must be discarded.

On the other hand, voice and video systems can tolerate some errors, since the occasional dropped bit does not have any significant effect on the resulting voice or video quality.

Video signals, in particular, require a high bandwidth. Whereas 64 kilobits is adequate for uncompressed 'telephony standard' voice transmission, TV quality video requires bandwidths of the order of megabits per second, even for a radically compressed signal.

Voice and video are traditionally carried on dedicated circuits using circuit switching (as in the PSTN).

The challenge, for the last several years, has been to devise data communications systems that can accommodate both types of data on a single network in order to accommodate the hybrid applications which are now being developed or planned.

Several attempts have been made recently to design such a hybrid network. The Frame Relay, ATM, DQDB, and SONET technologies all provide improvements over the traditional networks in some aspects of the problem, without quite solving all the problems in a true hybrid network.

The frame format used by Frame Relay is a derivative of the ISDN LAP-D framing structure. Like older packet protocols, frame relay uses an address field which identifies a virtual circuit. This has two implications for frame (packet) switching:

It is necessary to set up and tear down a virtual circuit through the network in order to transmit data. This is merely an initialization and termination overhead, although it can be significant for short transactions.

At each switch in the packet's path, the packet must be read by the switch processor and the virtual circuit id decoded in order to determine the appropriate outward path from the switch. The decoding of the virtual circuit id at each switch means is a processor intensive operation and a prime source of switching delay.

Basic frame relay is limited to 1024 circuits, which limits its use to private networks. Various extensions permit up to 22 bits of address field, or 4 million simultaneous circuits—still small by PSTN standards. This limited addressing capability simplifies the switching algorithm and reduces the switching overhead. Larger networks can be implemented by internetworking several frame relay networks.

Frame relay also gains speed, relative to the older (X.25, etc.) technologies by not performing error detection and correction in each switching node and by not guaranteeing sequencing or delivery of packets. Given the reliability of current technology, dropping error detection and correction from the switching nodes provides a significant speed improvement with minimal cost. Similarly, relegating the re-sequencing of packets to the customer premises equipment improves switching speed in the network at a relatively low cost.

The most controversial way in which frame relay gains speed is to discard packets when network congestion occurs. While this can be beneficial to many real-time applications, it can be a source of severe delays in session-oriented traffic.

The major remaining delay in switching frame relay packets is the delay involved in absorbing the packet into the switch and performing the routing algorithm.

Frame relay switching speed is estimated to be approximately 5 to 10 milliseconds per node.

Of all existing technologies, ATM comes nearest to being able to handle voice, video, and data. Like frame relay, it depends upon switched virtual circuit connections.

Like frame relay, ATM provides virtual circuits between customer end points, and does not perform error detection and correction in each switching node or guarantee sequencing or delivery of packets.

ATM networks transmit packets of fixed length (53 bytes) called 'cells'. Unlike frame relay, the virtual circuit identifiers are local to each link in the network and can be changed at each switch. While this resolves the frame relay problem of limited address capability, it does so at the cost of greater complexity in each switching node.

ATM switching speed is currently of the same order of magnitude as frame relay. Work in progress on photonic switching technologies will provide much faster switching.

However, the implementation of the switching technique in hardware is made more complex by several orders of magnitude by the ATM protocol, and there are significant problems in implementing the ATM virtual paths and channels in a network of significant size.

DQDB is, in essence, an extension of the LAN token ring technology to a metropolitan area. It is specified to run at 45 Mbit/s, 155 Mbit/s, or 622 Mbit/s. It is a dual bus technology and, as such, is severely limited in the number of connections it can handle. DQDB is primarily designed for high speed computer—computer communications. It is designed to transmit short (53 byte) packets at high speed, and the sending and receiving stations are responsible for splitting larger packets at the transmitter and reconstituting them at the receiver.

Given the limited access to DQDB systems, they are not suited for wide area networks, though they can operate as a metropolitan backbone link in a larger internetworking system, or multiple DQDB systems can be internetworked to provide a much larger network. In these cases, however, the queuing, switching, and assembly/disassembly of packets incurs significant delays.

Typical delays for a DS3 network is estimated at about 20 ms.

SONET is a fibber optic multiplexed transmission standard being developed by the CCITT. As a transmission and multiplexing technology, it supports various end-to-end transmission technologies, such as frame relay, ISDN, and FDDI. It does not, per se, provide any switching capability.

Like DQDB, FDDI is an extension of the token ring technology to higher speeds and to metropolitan areas. In the case of FDDI, the transmission speed is 100 Mbits/sec and an FDDI network permits up to 500 connections and a maximum loop length of 200 km. All the comments on DQDB are applicable to FDDI.

For the purposes of this specification, networks will be divided into two types: those which are large enough to require routing of data through intermediate nodes, and those which are not. The latter type is typically the isolated LAN, consisting of a single bus or star topology with no external connections. The switching networks range from linked LANs all the way up to the public switched telephone networks (PSTNs).

It is the larger networks with which the present invention is concerned. Addressing schemes for the PSTNs use the familiar telephone numbers—accepted (perhaps because there is no alternative), but by no means ideal. Data network naming schemes generally use a similar scheme of non-meaningful numeric or alphanumeric strings. The Internet is one of the few networks to use a more human-friendly naming scheme.

SUMMARY OF THE INVENTION

According to the present invention there is provided a data transmission network comprising a plurality of packet switches distributed throughout the network for transmitting data between a data source and destination; means for receiving incoming data and identifying the destination thereof; means for identifying a path through the network to said destination; means for assembling incoming data into packets and including in said packets a plurality of routing codes defining the path through successive switches in the network; and means in said packet switches for interpreting said routing codes in the received packets and routing said packets to the next switch in accordance therewith until the destination is reached.

In the present invention, all packets are switched dynamically based on absolute routing information in the packet header. As a result no look-up operation is required. This technique allows the packets to be switched with minimal delay, using hardwired switching logic.

The use of routing codes, rather than a link id. (virtual channel, virtual path), as the means of routing packets means that the routing codes can be interpreted directly by hardware in each packet switch. Furthermore, since the invention employs connectionless switching, it is not necessary to set up virtual circuits for each connection.

The invention invention also allows the switching/routing specification to be isolated in its own protocol layer; this makes the routing largely independent of (and compatible with) existing and future protocol suites, and has significant advantages in system design.

In a preferred embodiment, a packet trailer, which is automatically generated, records the return route to the packet originator at each stage through the network. The packet header and trailer can be dynamically modified as the packet flows through the network.

The naming functions can be isolated in specific 'name management' nodes, and the name format can be divorced from the network structure, which enables the use of a much more flexible and user friendly naming scheme.

The method fits into the Data Link layer of the OSI reference model. It handles only the routing of the packet through a switched network. It does not handle error detection and correction, flow control, packet sequencing or any of the other features traditionally associated with the data link and higher layers.

The method's independence and isolation is a major advantage, as it minimizes the changes to retrofit the protocol to an existing system such as X.25, Frame Relay, or ATM, and ensures that it can easily be incorporated into future protocols without impacting those protocols' design objectives in other areas.

The invention assumes a packet switched point-to-point network with switching nodes, as in the traditional wide area packet switching systems such as the X.25 networks. These networks are similar in topology to the public telephone network. However, where the PSTN sets up dedicated connections (physical paths assigned for the duration of the call, reserving bandwidth) to handle each call, and conventional packet switching systems set up 'virtual circuits' (paths assigned for the duration of the call, without reserved bandwidth) to handle each connection, this design provides a connectionless system. Connections can, of course, be established by higher protocol levels. However, unlike the PSTNs and packet switched WANs, the switching network does not recognize connections or require any information about connections. There is no 'virtual circuit'.

Lack of a 'virtual circuit' is another major advantage of the invention. It means that the network's switching nodes do NOT have to be aware of each path that passes through them, as is the case in current packet switching networks. Since the individual nodes are not aware of the packet paths that pass through them, the management of the network is greatly simplified and the network's ability to dynamically re-route around congestion or failures is significantly increased.

BRIEF DESCRIPTION OF THE DRAWINGS

The invention will now be described in more detail, by way of example only, with reference to the accompanying drawings, in which:

FIG. 15 shows a network with dynamic micro-routing;

FIG. 16 shows a routing header and trailer;

FIG. 17 shows the routelet replacement data;

DESCRIPTION OF THE PREFERRED EMBODIMENTS

Figure 1:
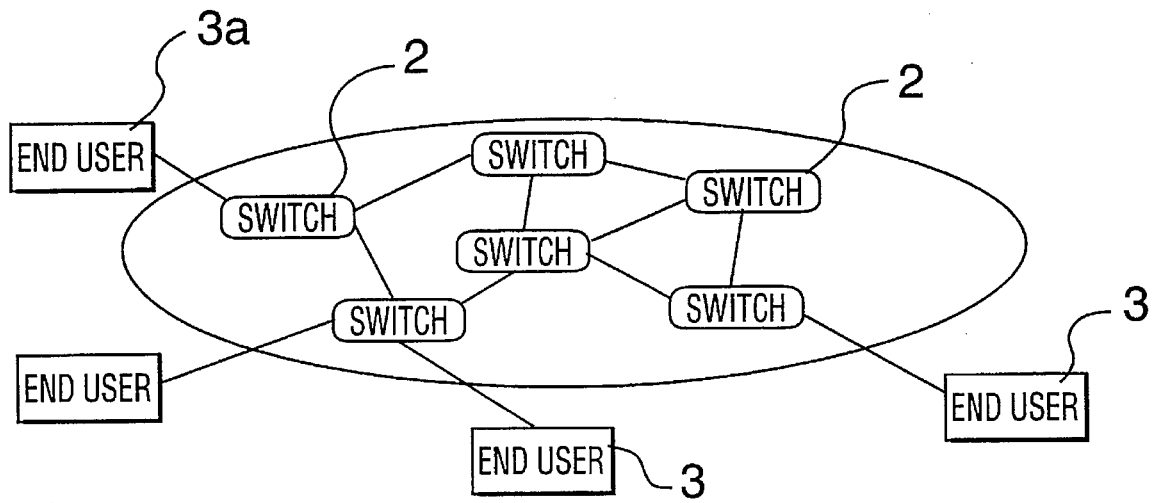
FIG. 1 is a diagram of a conventional point-to-point switched network.

Referring firstly to FIG. 1, this shows a conventional point-to-point switched network, such as a standard telephone network, containing switches 2 to which end users 3 are connected. When two end users 3 establish communication through the network, a dedicated circuit is established between the two end users for the duration of the call. As discussed above, such an arrangement makes inefficient use of available bandwidth.

Figure 2:
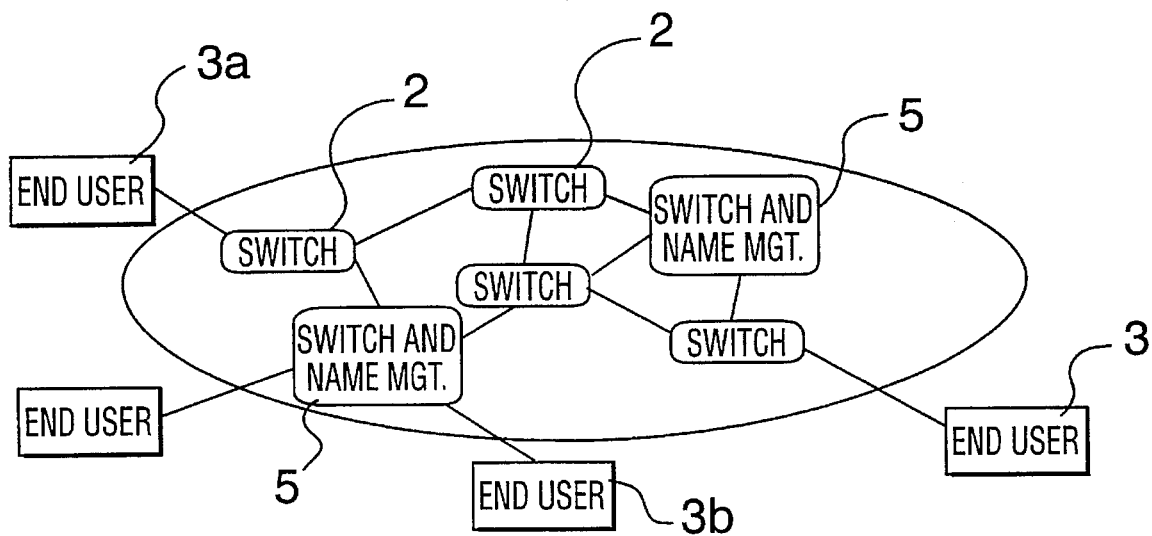
FIG. 2 shows a packet switched network embodying the present invention.

FIG. 2 shows a packet switched network embodying the invention. As can be seen, the network topology is very similar to that of the PSTN and wide area packet switch networks. Topologically, the only distinction is some nodes will only switch packets while others 5 will also handle name resolution functions.

For example, if user wants to establish a call to user 3b, user 3a initially sends a packet requesting routing information without routing information. Switch 2a detects the absence of routing information and passes the packet to name management switch 5a, which identifies the destination address, held in the packet payload, and having knwoledge of the network topology establishes a route through the network from user 3b to user 3b. This information is incorporated in the packet payload, which is returned to user 3a using information in the packet trailer, as will be described, to determine the return path. When user 3a receives the returned packet containing the routing information, this can be incorporated in the header of subsequent packets to send them to their destination.

Figure 3:
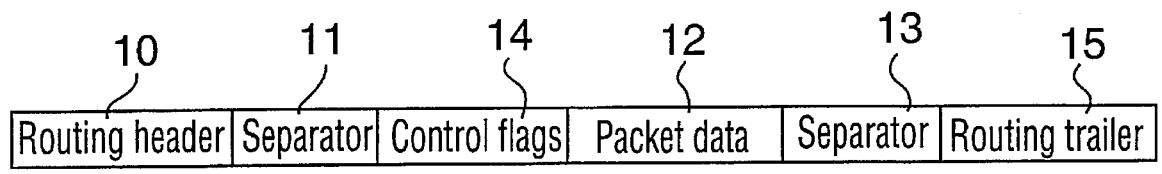
FIG. 3 is shows the structure of a packet in accordance with the invention.

The generic packet structure is shown in FIG. 3. A standard point-to-point communications link, using a framing scheme to distinguish packet data from inter-packet gaps, will be assumed. For instance, HDLC or SDLC use unique flags and bit-stuffing to distinguish packet data from transmission gaps. Other packet framing systems may also be employed.

In FIG. 3, the routing header 10 contains the codes required to route the packet through the network. It is NOT part of the packet frame check block, and varies in content and size as the packet passes through the network. Separator 11 is a unique code that is used to signal the end of the routing header. The 'packet data' 12 is the payload of the packet, and will typically contain user data and higher layer protocols, including a frame check.

The routing header 10 is a variable length string of 'routelets'. The size of a routelet may differ in different networks. Byte (8-bit) sized routelets and nibble (4-bit) sized routelets are most practical, but other sizes are possible. Each routelet defines the switching (absolute) path at a switching node. It is absolute because it depends only on the hardware configuration of the node; it is independent of the connection using it.

If a routelet contains n bits, it can take $2^n$ different values. The last value ($2^n-1$) will be used as the separator symbol, and will therefore be unavailable for use as a routing code. The value $2^n-1$ is called the inherent switching capability of the network, and is the maximum switching ability of each routelet.

The separators 11 are routelets containing the separator symbol. A separator terminates a string of routelets. Data between the separators consists of byte sized symbols. Separator symbols can occur in the packet data, and the protocol does not use 'escape' characters or other means to indicate these separators. The initial separator 11 is recognized as the first separator in the routelet stream. The final separator 13 is the last separator value before the routing trailer string (i.e. it is the first separator encountered when reading backwards through the routing trailer).

The control flags field 14 is a byte containing flags which indicate whether the payload (the packet data) contains user information, a route request, or network management information. User information is meaningful only to end user processes and has no meaning to the network. A route request is a request from a user for the network to provide addressing/routing information, and is the only direct communication between the end user and the switching nodes. Network management information is used to control the network and configure the switching nodes.

The packet data field 12 is the payload of the packet. It may contain information used to control the network, or end user data, depending on the preceding control flags 14.

The routing trailer 15 also consists of routelets. However, where the routing header describes where the packet is going, the routing trailer describes where it has come from.

As a packet passes through a switching element 2, 5, the element receives the first routelet and uses it to define the outbound path from the element, i.e. if an element has 'n' inbound and 'n' outbound paths (numbered 0 . . . n–1), where n is less that or equal to the inherent switching capability of the network, the first routelet is stripped from the packet and used to select the outbound path. The rest of the packet is passed directly to the outbound path until the end of the packet is detected, and is scanned for a separator value. When the end of the packet is detected, a new routelet is appended to the packet, but only if a separator was found in the packet. The new routelet is the number of the inbound path.

While it is possible for the number of inbound paths to be different from the number of outbound paths, this will be unusual. It will be assumed that the number of inputs is equal to the number of outputs.

Thus, at each stage in its journey through the network, the packet contains a routing header which describes where it is going, and a routing trailer which describes where it has come from. When it enters the network, the routing header describes the path to the packet's destination and the routing trailer is null. When it exits the network, the routing header is null and the routing trailer describes its return path. By reversing the order of the routelets, the routing trailer becomes the routing header for the return journey.

One problem that is dealt with by the above system is the case where corrupted packets could circulate around the network indefinitely, eventually causing congestion and network lock-up. This can only happen if the rogue packet does not contain a separator or invalid routelet. Without the safeguard of requiring a separator before appending the final routelet, each switching element would remove a routelet from the front of the packet and append one to the end, and the packet might circulate endlessly. With the safeguard, the packet will shrink as it passes through each switching element, and will eventually disappear.

The structure of a switching node will now be described in more detail.

Figure 4:
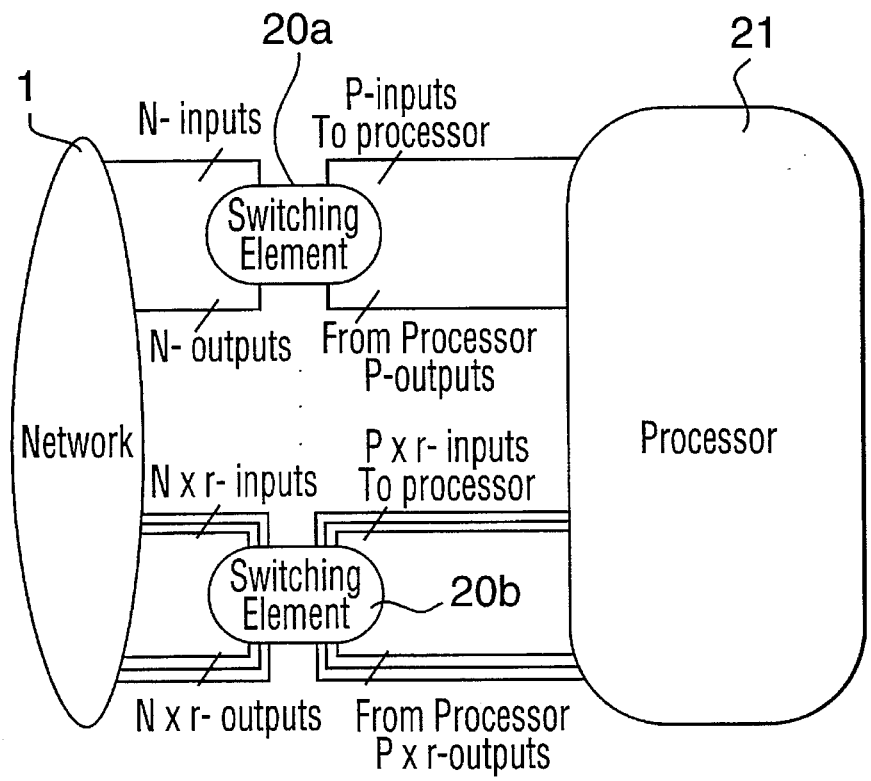
FIG. 4 is a high level block diagram of a switching node.

As shown in FIG. 4, a switching node 2 or 5 consists of one or more switching elements 20a, 20b and a processor 21 (CPU, I/O channels, memory, etc.).

Each switching element 20 has a number ('m') of inputs from the network ('N-inputs') and the same number of outputs to the network ('N-outputs'). In switching element 20b, the inputs and outputs are arranged in groups of r, each group having a common routing code for reasons that will be explained in more detail below.

As can be seen in FIG. 4, the switching element 20 has links to and from the processor 21 in addition to inputs from the network 1 and outputs to the network 1. These links are used to divert packets to the processor 21 when the switching element 20 is unable to handle the required routing. This might happen, for example, if the desired outbound path is busy, if the routing code does not match a known routing code, or if there is only a separator at the front of the packet, in which case the switch knows to pass the packet to a name management switch 5. If the switching element 20 has 'm' inputs and 'm' outputs, the connections to the processor (P-inputs) consist of 'm' identical connections, each connection consisting of:

a block of shared memory, control ports, and an interrupt line.

Each P-input is associated with the corresponding numbered N-input line. Each P-input has its own shared memory, ports and interrupt line, distinct from those of other P-inputs. The shared memory is a contiguous block of memory, large enough to hold several packets (e.g. 16 Kbytes or 64 Kbytes). It is used to transfer packets to the processor. The shared memory is used as a circular buffer by the switching element, and each new packet is started on a byte boundary.

Similarly, the processor can access a switching element via a set on 'm' identical output connections from the processor to the switching element (P-outputs). Each P-output consists of:

a block of shared memory, control ports, and an interrupt line.

Each P-output controls the corresponding network output line. The shared memory is used to hold packets to be output to the switching element. The control ports are used to specify the packet address and length and to initiate the transfer. The control ports also provide the status (busy, disabled) of the corresponding switch element network output port and enable the processor to enable or disable the corresponding network output port.

The connections to the processor are used as follows:

When a packet cannot be routed to an N-output by the switching element, it sends the packet to the processor using the corresponding P-input connection (i.e. if the input port number is 'm', it uses P-input 'm' to the processor). In this case, the initial routelet is not stripped, but is sent to the processor 21 along with the rest of the packet. As bits are received, they are dumped into the next available bits of the shared memory. Note that the packet may not consist of an integral number of bytes. When the complete packet has been dumped into the shared memory, the switching element sets the starting offset and byte/bit count into the control ports and generates an interrupt to the processor. It is up to the processor 21 to service this interrupt, and read the control ports before another interrupt occurs on this P-input. The processor 21 must also remove the received packet from the shared memory before it is overwritten by more data. Thus, the circular buffer must be large enough to give the processor time to remove the packet.

Packets which have been diverted to the processor 21 or which originate in the processor are sent to the network via the P-outputs.

There are only two reasons why the packet will be routed to the processor rather than being passed through to an N-output port: The required output port is busy or disabled, or the routelet is the not an output port number (either too large or the separator).

The output port will be busy if it is already occupied transmitting a packet from another input or if it is transmitting a packet from an processor output connection (see below). In either case, the incoming packet must wait until the output port is free, so it must be diverted to the processor 21 where it can be stored until the output port is available.

The output port can also be disabled by the processor. A port may be disabled for a number of reasons. For instance, there may not be physical connection. Alternatively, if there is a temporary fault on the link, the port can be disabled so that packets are diverted to the processor where they can be rerouted around the problem.

If the packet was diverted because the routelet is too large (not a valid output port number) but is not the separator, the packet can be discarded. It is either misrouted or some bits have been corrupted during transmission. In either case, the switch will discard the packet and take no other action. The system relies on a higher level protocol to time out and re-transmit the packet.

If the packet was diverted because the separator was encountered, the processor has a choice to make, based on the control flags. If the control flags 14 indicate that the packet carries user data, its destination should not be a network switching node 2, 5. The routing information must have been incorrect or corrupted in transit. As above, the packet is discarded and no other action is taken.

If the control flags 14 indicate that the packet carries network management information in its payload, the processor 21 must decode the packet payload and handle the network management request. The packet data portion 12 of a network management packet contains an identifier for its destination node, so that corrupted packets which end up at the wrong node can be recognized as such.

If the control flags 14 indicate that the packet carries a route request, the processor 21 must handle the request. If this is also a name management node, the processor will validate the name and determine the packet source (from the routing trailer) and will calculate a route from the source to the destination. It will then generate a route response packet and return it to the originator of the route request packet.

The name management node 5 may have to consult higher level name management nodes if it cannot resolve the destination name itself. The naming system, since it is divorced from the physical addressing and routing structures of the network, may be implemented in many different ways, for example using a hierarchical scheme similar to the Internet system. The invention thus allows the implementation of a flexible naming system which is not related to physical location or network topology, and provides a simple means of accessing the name resolution subsystem.

If this the node is not a name management node 5, the processor 21 will forward the packet to the nearest name management node where it will be processed. Note that the processor 21 does not need to know the network route to the name management node (although this would speed the transmission). All it requires to know is the network output line on which it should transmit the packet. The packet can then be transmitted as received (with a null routing header). The receiving node then performs the same processing until the packet reaches a name management node.

This arrangement minimizes the amount of global network configuration data that needs to be distributed through the network, and thus reduces the complexity of managing the network and the potential for errors. The only situation that must be avoided is configuring a part of the network so that route request packets are transmitted in an endless loop. If the network has a hierarchical structure, this is easy to avoid.

To obtain routing information, the user node creates an route request packet identifying the destination for which it requires a route, and issues it to the network with a null routing header. It is then passed from node to node until it reaches a name management node (its routing trailer will contain the route from the originator). The name management node generates the route requested and returns it to the user node. The user node does not need to know anything about network topology or about the location of a name management node.

The P-output connections are much simpler. Their function is to transmit packets from the processor 21 to the switch elements, to put them back into the network. To do this, the processor generates a packet or copies it from a P-input buffer and sets up the P-output control registers to start packet transmission. The switch element transmits the packet as soon as the network output line becomes free, and will then interrupt the processor to inform it that transmission is complete.

It should be noted that that P-inputs and P-outputs of the switching element 20 are inputs and outputs respectively from the perspective of the processor 21. From the perspective of the switching element 20, P-inputs are actually output units and P-outputs are input units.

Figure 5:
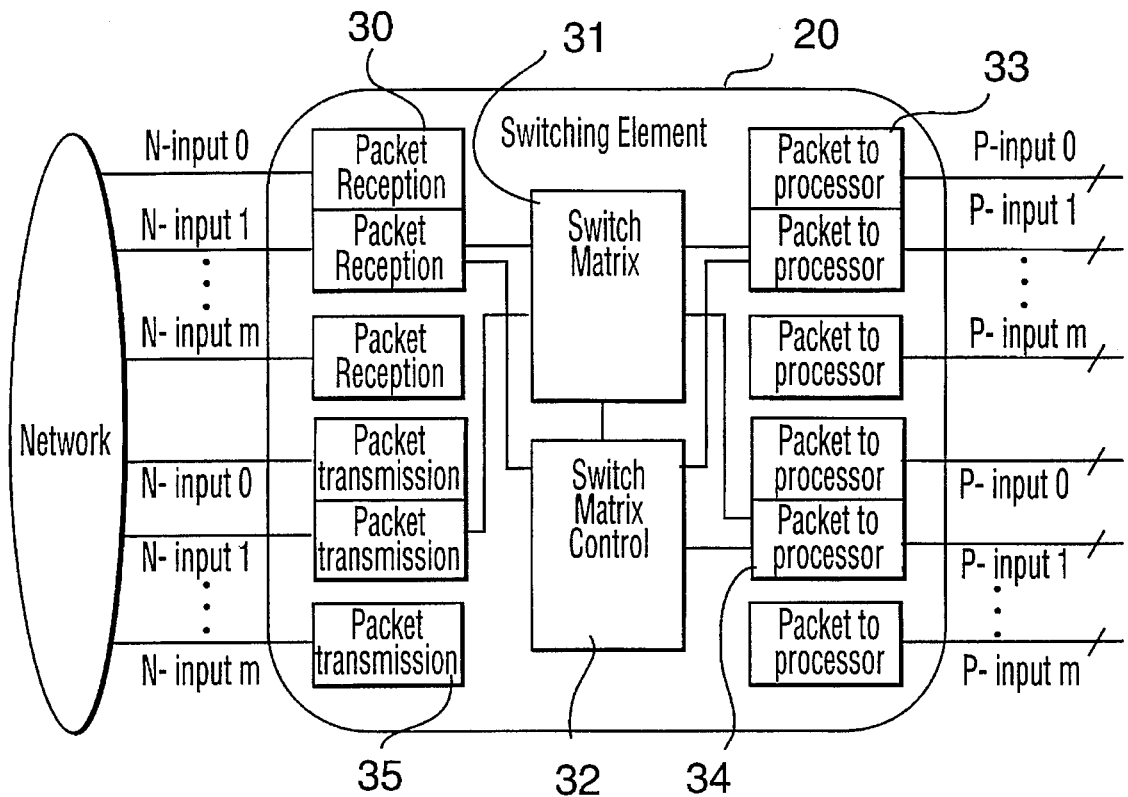
FIG. 5 is a block diagram of a switching element.

FIG. 5 provides a more detailed block diagram of the switching element, which is implemented in hardware. It will be assumed that the routing codes, known as routelets, are 8-bits each. To simplify the diagram, connections to and from the switch matrix and switch matrix controller are only shown for a representative subset of elements. In fact, each group of 'Packet reception', 'Packet transmission', 'Packet to processor', and 'Packet from processor' blocks has identical connections to the switch matrix and switch matrix controller.

Figure 6:
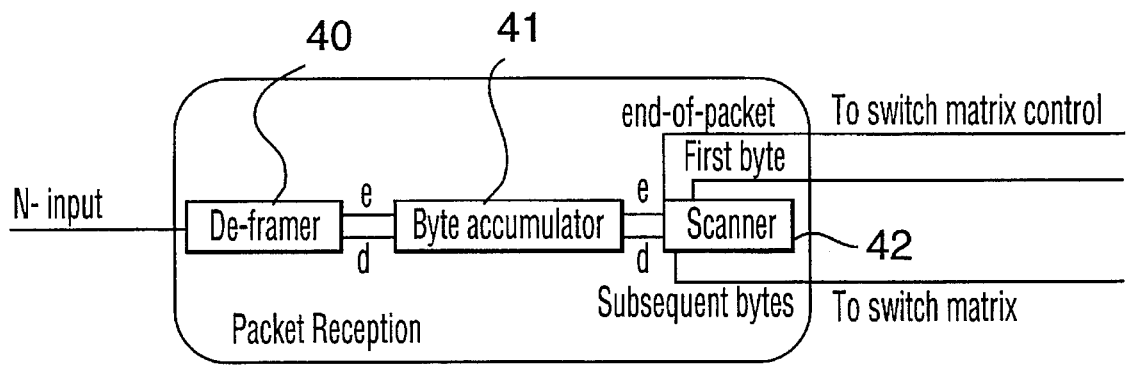
FIG. 6 is a packet reception block diagram.

Each N-input line connects to a 'Packet reception' block 30, which in turn is connected to the switch matrix 31 and switch matrix controller 32. The 'Packet reception' block 30 processes the incoming data stream and extracts packets from the data stream. A breakdown of the 'Packet reception' block is shown in FIG. 6.

The De-framer block 40 is responsible for receiving the incoming bit stream and performing flag detection and bit-stripping (an HDLC bit stream is assumed). Once flags and stuffed bits have been removed, the bits of the packet are passed to the Byte accumulator 41 where they are assembled into bytes/routelets. All bytes then pass to the Scanner 42. The Scanner 42 passes the first byte of each packet to the control portion 32 of the switch matrix, and subsequent bytes are passed to the switch matrix itself 31. All byte values are checked by the Scanner 42 for a separator value. If seen, the Scanner 42 sets an internal flag to indicate that a separator was encountered. When the De-framer 40 detects a flag, it passes the end-of-packet signal to the Byte Accumulator 41, which sends any remaining data to the Scanner 42 and then passes on the end-of-packet signal. On receiving the end-of-packet signal, the Scanner 42 checks to see if a separator was encountered. If so, it issues its (hardwired) port number to the Switch Matrix as the last byte of the packet. The Scanner 42 then resets its 'first byte' flag and its 'separator seen' flag and sends the end-of-packet control signal to the Switch Matrix Control 32.

When the Switch Matrix Control 32 receives a routelet from an N-input, it scans its control memory to determine if the designated N-output path is available. If so, the N-input path is assigned to the designated N-output path in the control memory. If the designated N-output does not designate a valid N-output, or the designated N-output is busy, the control element assigns the N-input path to the identically numbered P-input path and passes the routelet to the P-input as the first byte of the packet.

When the Switch Matrix Control 32 receives the end-of-packet signal, it clears the control memory for the N-input, freeing the associated connection. If the connection was to an N-output, the control element checks the 'data waiting' flag (see below). If set, the flag is cleared, the associated P-output is connected to the N-output, and the packet waiting in the P-output is started.

Figure 7:
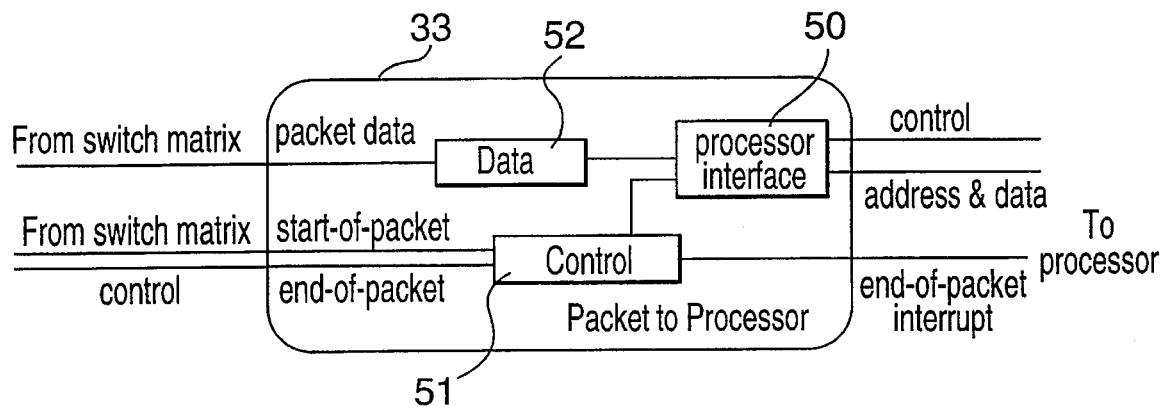
FIG. 7 is a block diagram of a packet-to-processor block.

In FIG. 5 each P-input line connects a switching element 31 to a port on the main processor. A 'Packet to processor' block 33 controls the interface to the processor. A breakdown of the 'Packet to processor' block is shown in FIG. 7.

The processor interface block 50 of the 'Packet to processor' unit contains 16 kbytes of dual-port memory, dual-port control logic, packet control registers, an interface to the 'Control' 51 and 'Data' blocks 52, and address and data logic for the processor interface.

The P-input 'Packet to processor' block consists of two almost-independent subsystems. When a packet is assigned to the P-input, the Switch Matrix Control 32 sends a start-of-packet signal to the control section of the 'Packet to processor' block. On receipt of this signal, the processor interface 50 initializes the packet control registers. Specifically, it sets the packet address (to the next available byte in the circular dual port memory) and initializes the packet size count. The routelet value is then stored at the start of packet address.

The packet to processor block then receives data bytes from the Switch Matrix 31 which it passes to the processor interface 50. Each data byte is stored in the next available byte of the dual port memory, and the packet length is incremented.

On packet completion, the packet to processor block 33 receives the end-of-packet signal from the Switch Matrix Control element 32. It then moves the packet address and length values to a similar pair of registers that the processor can access and clears its internal registers for the next packet. It generates an interrupt to the processor, to notify it of the end of the packet.

Figure 8:
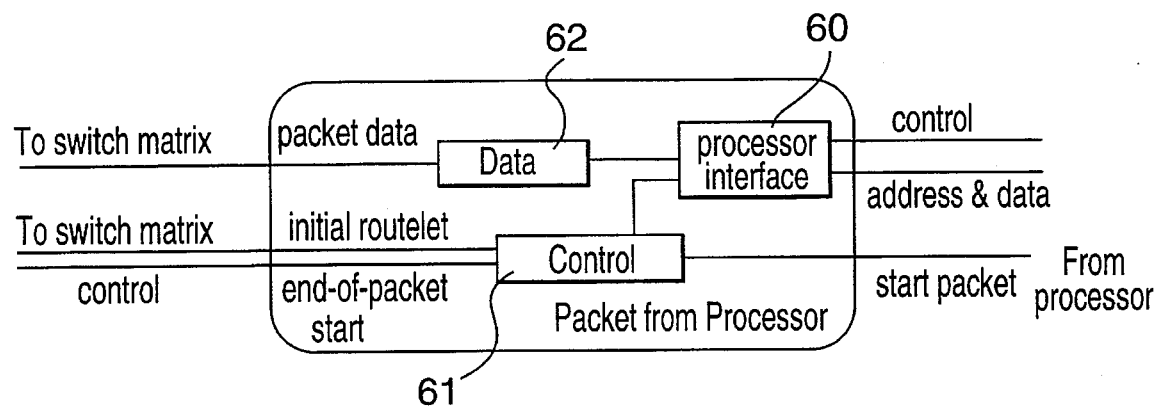
FIG. 8 is a block diagram of a packet-from-processor block.

Each P-output line connects the main processor 21 to a switching element 20 via a packet-from-processor unit 34, shown in detail in FIG. 8.

The unit performs the reverse of the P-input processing. The processor interface block contains 16 kbytes of dual-port memory, dual-port control logic, packet control registers, an interface to the 'Control' 61 and 'Data' 62 blocks, and address and data logic for the processor interface.

The processor initiates a packet transmission by loading an outgoing packet into the dual port memory, setting up the packet start address and length in the packet control registers, and sending a 'start packet signal to the unit.

On receiving a 'start packet' signal from the processor, the unit first copies the packet address and length to in internal register pair, freeing the processor registers. It then passes its hard-wired port number to the Switch Matrix Control 32. If the designated N-output is busy, the control element 61 flags the N-output path so that the P-output can be activated when the current packet is complete. When the N-output becomes free, the N-output is assigned immediately to the P-output. If the designated N-output is free, the N-output is assigned immediately to the P-output.

Once the N-output is assigned, the Switch Matrix Control 32 sends a 'start' signal to the P-output, and data transfer begins. On completion of the packet transfer, the unit 34 signals 'end-of-packet' to the Switch Matrix Control 32 and to the processor. The Switch Matrix Control 32 clears the assignment and frees the N-output.

Figure 9:
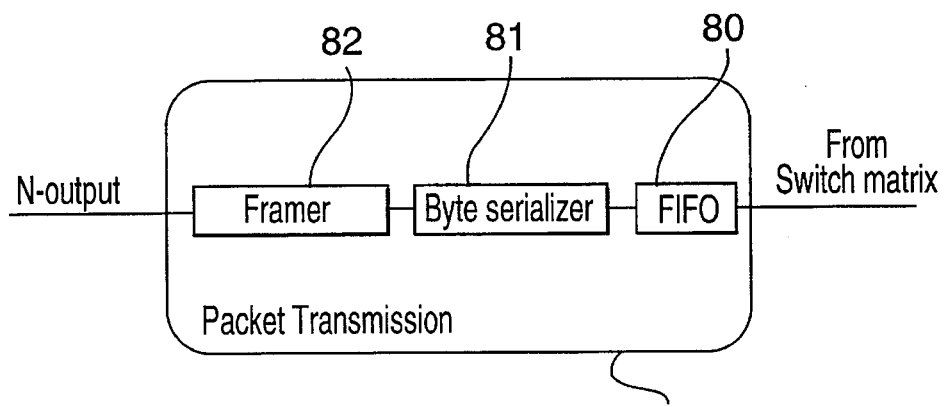
FIG. 9 is a block diagram of a packet transmission block.

Each N-output line is connected to a Packet transmission block 35. This block 35 controls the transmission of data to the network. Effectively, it reverses the processing of the N-input block. A breakdown of the 'Packet transmission' block is shown in FIG. 9.

The packet transmission block 35 interfaces only to the Switch Matrix 31. As bytes are received from the switch, they pass through the FIFO unit 80 and are then serialized in byte serializer 81 and passed to the framer 82. The FIFO is necessary as bit stuffing may cause the framer to fall behind the arrival of bytes from the switch. The framer performs bit stuffing as required by the data. When the framer finds no further data is available, it outputs flags to the network.

Figure 10:
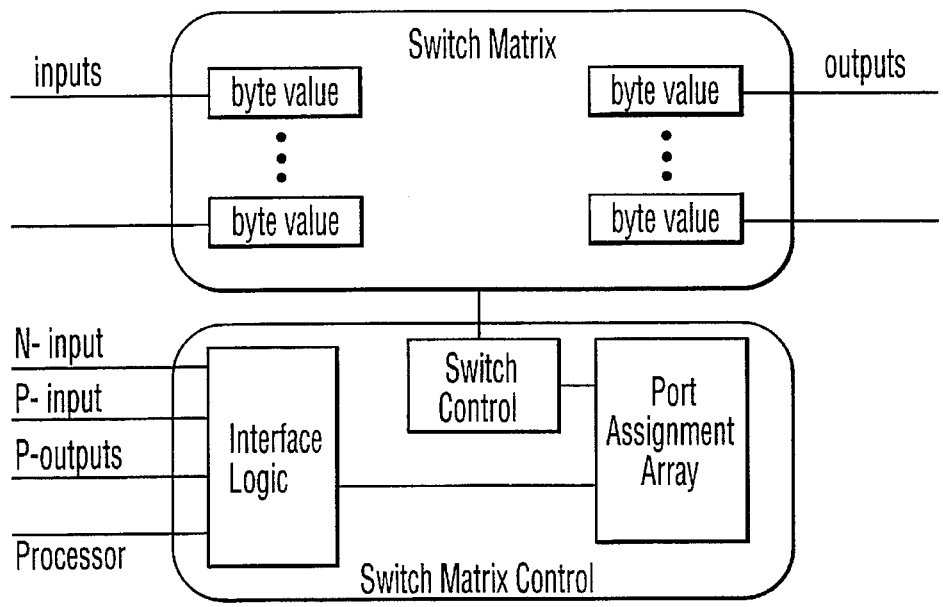
FIG. 10 is a block diagram of the switching matrix.

FIG. 10 is a block diagram of the Switch Matrix 31 and Switch Matrix Control unit 32. For convenience, miscellaneous control functions which are not strictly part of the switch are included in this block.

The switch matrix 31 contains a port 90, 91 for each of its input and output units. Each port is capable of holding one byte of data, and has control lines to perform handshaking with the input or output unit. Internal transfer between ports if the matrix is handled by the Switch Matrix Control unit 32.

The Switch Matrix Control unit 32 consists of three primary blocks 92, 93, 94. The Interface Logic 92 is responsible for handling all control interactions with the N-inputs, P-inputs, P-outputs, and direct communication with the main processor 21. Each individual unit has its own set of ports within the interface logic block 92. The Interface Logic 92 contains and manages various control registers (such as the P-output waiting flag) that are specific to the different types on input or output. It is also responsible for performing and clearing port assignments.

The processor interface allows the main processor 21 to enable and disable individual input and output ports. Disabling an input port inhibits all input from the port. Disabling an output port makes it appear permanently busy, so that all packets the switch attempts to pass to it are diverted to a P-input. Enabling a port permits the normal operation, as described above.

The Port Assignment Array 94 holds the current switch assignments, as an array of values indexed by the (internal) input port number. Each entry in the array is either the number of the output port to which the input is assigned or a 'null' value indicating no assignment.

The Switch Control block 93 performs the switching function. It inspects, in an endless loop, each of the Port Assignment Array entries. If an entry is null, the Switch Control proceeds to the next array entry. If it is not null, the Switch Control inspects the corresponding input port to see if it contains a value to switch. If not, the Switch Control proceeds to the next array entry. If the port has a byte to switch, the Switch Control 93 removes it from the input port and transfers it to the output port indicated by the array entry. It then proceeds to the next array entry.

A basic routing algorithm for the switch and associated hardware will now be described.

```
Routing in a Switching Element (implemented by the switch
element hardware)
On each N-input:
    var i = number of this N-input // in range 0 to n-1,
    where n = number of N-inputs
    do (forever)
        While (waiting for packet)
            idle
        end while
        Get first routelet
        If (first routelet < n)
            var j = first routelet
            If (N-output[j] is available (idle))
                Configure switch element to route this
                N-input to j-th N-output
                Discard first routelet
            else
                Configure switch element to route this
                N-input to i-th P-input
                Send first routelet to i-th P-input
            end if
        else        // first routelet > = n
            Configure switch element to route this N-
input to i-th P-input
            Send first routelet to i-th P-input
        end if
        While (more packet data)
            pass data to configured output, scanning for
a separator
        end while
        If (separator seen)
            send routelet containing N-input number (i)
to configured output
        end if
        set configured output port idle
    end do
Routing in a Switching Processor (implemented by the
processor hardware)
On each P-input:
    var i = number of this P-input // in range 0 to n-
1, where n = number of P-inputs
    do (forever)
        While (waiting for packet)
            idle
        While (packet data)
            add data to memory
            increment count
            increment memory pointer modulo block size
        end while
        Put packet start address and length in control
registers
        Generate interrupt to processor
    end do
On each P-output:
    var i = number of this P-input // in range 0   to n-
1, where n = number of P-inputs
    do (forever)
        While (waiting for instructions)
            idle
        If (instruction = set N-output state)
            get new state from control registers
            set state in N-output[i]
        end if
        If (instruction = get N-output state)
            get state from N-output[i]
            set state in control registers
        end if
        If (instruction = transmit packet)
            wait until N-output[i] is idle
            configure switch element to route this P-output to i-
th N-output
            get packet start address and length from
            control registers
            while (more packet data)
                get data from memory
                pass data to configured output
                decrement count
                increment memory pointer modulo block
                size
            end while
            set configured output port idle
            Generate interrupt to processor
        end if
    end do
Processor (implemented by the processor software):
    On interrupt from P-input:
        queue packet for processing
    end interrupt
    On interrupt from P-output:
        queue transmit completion notification
        if (another packet waiting for this P-output)
            initiate packet transmission
        end if
    end interrupt
    Main loop:
        Do (forever)
            while (nothing in queue)
                idle
            end while
            get first queue entry
            if (incoming packet)
                if (first routelet < n) // valid
                routelet
                    if (N-output is being re-routed)
```

```
                    reset packet routing
                end if
                queue packet (for appropriate P-
                    output)
            else if (first routelet < separator)
                // bad routelet
                discard packet
            else         // separator
                get control flags
                if (route_request packet)
                    queue packet for name
                        management subsystem
                else if (network management packet)
                    queue packet for network
                        management subsystem
                else
                    discard packet
                end if
            end if
        else         // transmit completion
            release packet
        end if
    end do
end main loop
Subroutine: queue packet (for P-output)
    use the first routelet to determine p-output number
    discard first routelet
    copy the rest of packet to P-output area
    link packet to output list
    if (P-output is idle)
        initiate packet transmission
    end if
    return
end subroutine
Subsystem: Name Management subsystem
    Do (forever)
        while (nothing in queue)
            idle
        end while
        get first queue entry
        if (this is a name management node)
        // only one of this section and the next will
        be // present in a specific implementation
            examine request for name routing
            // details of the name management
                subsystem are independent of this
                design
            if (this node can handle the routing)
                generate response packet
                queue packet (for appropriate P-
                    output)
            else
                prefix routing to higher level name
                    management node
                queue packet (for appropriate P-
                    output)
            end if
        else      // this is NOT a name management
                node)
            prefix routing to name management node
            queue packet (for appropriate P-output)
        end if
    end subsystem
Subsystem: Network management subsystem
    Do (forever)
        while (nothing in queue)
            idle
        end while
        get first queue entry
        process network management request
        // details of the network management subsystem
are independent of this design
        if (response is appropriate)
            generate response packet
            queue packet (for appropriate P-output)
        end if
    end subsystem
```

It should be noted that in queueing a packet for a P-output, there are several options: In the simplest case, packets are queued FIFO, with no attempt at optimization. If the control flags contain information on the urgency of a packet (e.g. real-time voice and video take priority over computer-computer data), the queueing algorithm can maintain a prioritized queue thus reducing the switching delays for packets with real-time requirements.

The invention is capable of very fast switching if the N-output at each switching element is not blocked (i.e. if the packet does not need to be diverted into the associated processor). This section puts some numbers to the raw switching performance and analyses the realistic performance under various traffic loads.

The performance of the invention will now be explained. The raw performance of a switching element is determined by two factors, namely the network data rate, and the size of the switched block.

The network data rate is an implementation function. However, higher data rates provide better overall performance, as compared to multiple parallel circuits running at lower data rates. It is assumed in the following that the entire network operates at a single data rate. This is not a necessary requirement; however it will be necessary to pass each packet through a switching processor whenever a speed change occurs, with resulting delays.

The routing delay depends on how many bits must be held in the switch before they can be transmitted. For systems using an HDLC-type bit-stuffing protocol, a minimum of 7 bits is required to detect a flag. However, it will be assumed that 8 bits is a more convenient size to hold.

The delay in moving a packet through a switching element, assuming that the desired output port is not blocked, is therefore given by the expression $$t=n/s,$$

where t is the delay in seconds, n is the number of bits held in the switch, and s is the transmission rate in bits/second.

The following table gives some sample delays for different transmission speeds.

| Transmission Speed | Delay for 8-bit block |
| --- | --- |
| 64 kbit/sec (DS0) | 125 microsec |
| 128 kbit/sec | 62.5 microsec |
| 1.544 Mbit/sec (DS1) | 5.18 microsec |
| 6.312 Mbit/sec (DS2) | 1.27 microsec |
| 44.736 Mbit/sec (DS3) | 178 picosec |
| 274.176 Mbit/sec (DS4) | 29.2 picosec |

Assuming that no switch in the packet's path is blocked, the total delay through the network is given by:

$$t = \frac{n \cdot m}{s} + k \cdot \lambda \, c$$

where t is the delay in seconds, n and s are as above, m is the number of switching elements that must be traversed, k is the length of the transmission path through the network, c is the speed of light in km/sec, and λ is the fraction of the speed of light at which a signal passes through the network.

In the above, the expression $$\frac{n \cdot m}{s}$$

represents the switching delay and $k\lambda c$ represents the transmission delay.

The following table gives some representative delays, assuming an 8-bit switched block size and $\lambda=1$:

| Transmission Speed | Delay for 1 switch, 30 km | Delay for 6 switches, 300 km | Delay for 10 switches, 3000 km |
|---|---|---|---|
| Transmission delay | 100 microsec | 1000 microsec | 10,000 microsec |
| 64 kbit/sec (DS0) | 225 microsec | 1750 microsec | 11,250 microsec |
| 128 kbit/sec | 163 microsec | 1375 microsec | 10,625 microsec |
| 1.544 Mbit/sec (DS1) | 105 microsec | 1031 microsec | 10,052 microsec |
| 6.312 Mbit/sec (DS2) | 101 microsec | 1008 microsec | 10,013 microsec |
| 44.736 Mbit/sec (DS3) | 100 microsec | 1001 microsec | 10,002 microsec |
| 274.176 Mbit/sec (DS4) | 100 microsec | 1000 microsec | 10,000 microsec |

As can be seen in the above table, the switching delays are comparable to the transmission delays in the worst case, and insignificant in the best cases. Specifically, this means that a packet switched system using this technology can perform as well as a circuit switched system or a dedicated communications link.

To illustrate the potential for very high speed switching over a LAN. The following table gives similar results for a LAN environment:

| Transmission Speed | Delay for 1 switch, 30 m | Delay for 3 switches, 300 m | Delay for 3 switches, 3000 m |
|---|---|---|---|
| Transmission delay | 100 picosec | 1000 picosec | 10,000 picosec |
| 10 Mbit/sec (Ethernet) | 900 picosec | 3400 picosec | 12,400 picosec |
| 100 Mbit/sec (FDDI) | 180 picosec | 1240 picosec | 10,240 picosec |
| 1 Gbit/sec | 108 picosec | 1024 picosec | 10,024 picosec |

Even in this situation, the switching delay is reasonable compared to the transmission delay, and very small in absolute terms. Again the performance of a switched system is as good as the performance of a non-switched (pure bus) system.

All the above numbers assume that the packet has a clear path through the network, and never has to be diverted to a switching processor. In a more realistic scenario, this is not true.

A simple model of a real switching system can be derived by using an overall busyness factor for the network. Thus if that a typical link is operating at x% of its total capacity, the probability that an incoming packet will find the outgoing link busy is $p=x/100$.

The delay caused by diverting a packet through the switch's processor must be determined. There are three factors involved here, namely the time for the processor to absorb the packet, software processing delays, and the time to transmit any packets ahead of our packet in the output queue.

It will be assumed that the switch processor must completely receive the packet before it can process it. This is not necessarily true, but considerably simplifies the switching software and hardware. Then the time to receive the packet depends only on packet size and transmission rate. For a packet of b bits, the time required to completely receive the packet is $$t_r = b/s$$

The software processing delays are difficult to predict for an unknown processor. They could be 10 microseconds or less for a custom designed processor. However, since this number is highly unpredictable without a specific processor in mind, it will be omitted from the following calculations. Add it in when you have a specific implementation in mind.

If $b_{av}$ is the average packet size, the time to transmit n packets ahead of our packet in the queue is $$t_t = \frac{n \cdot b_{av}}{s}$$

Given a Poisson distribution of packet arrivals, $$P_n(t) = e^{-lt} \frac{(lt)^n}{n!}$$

where n is the number of arrivals in time t and l is the average number of packets per second on a network link, the expected number of packet arrivals in time t is lt. l can be related to the busyness factor, p, by:

$$p = l \cdot \frac{b}{s}$$

Assuming a fixed packet size ($b=b_{av}$) the average packet arrival rate is $$l = p \frac{s}{b}$$

and the packet disposal rate is s/b so the ratio of arrival rate to disposal rate is p.

The average queue size at a P-output is $$\frac{p}{1-p}.$$

Therefore the average delay in transmitting a packet through a switch element is:

$$(1-p) \cdot \frac{8}{s} + p \cdot \left(1 + \frac{p}{1-p}\right) \cdot \frac{b}{s} =$$

$$\frac{8q^2 + bp}{qs} \text{ where } q = 1-p.$$

To account for the software delay, assuming an approximately constant software overhead of m microseconds, the above formula must be amended to:

$$\frac{8q^2 + bp}{qs} + pm$$

By way of example the switching delay for a packet size of 500 bits, which corresponds approximately to the frame relay packet size, is shown in the table below.

| Transmission Rate (s) | Packet Size (b) | Busyness (p) | Switching delay |
|---|---|---|---|
| 1.544Mb/s | 500 bits | 0.8 | 1300 microsec |
| 1.544Mb/s | 500 bits | 0.7 | 760 microsec |

-continued

| Transmission Rate (s) | Packet Size (b) | Busyness (p) | Switching delay |
|---|---|---|---|
| 1.544Mb/s | 500 bits | 0.6 | 490 microsec |
| 1.544Mb/s | 500 bits | 0.5 | 330 microsec |
| 1.544Mb/s | 50b bits | 0.4 | 220 microsec |
| 1.544Mb/s | 500 bits | 0.3 | 140 microsec |
| 1.544Mb/s | 500 bits | 0.2 | 85 microsec |
| 1.544Mb/s | 500 bits | 0.1 | 40 microsec |
| 1.544Mb/s | 500 bits | 0.01 | 8.4 microsec |
| 6.312Mb/s | 500 bits | 0.8 | 320 microsec |
| 6.312Mb/s | 500 bits | 0.5 | 80 microsec |
| 6.312Mb/s | 500 bits | 0.25 | 27 microsec |
| 6.312Mb/s | 500 bits | 0.1 | 10 microsec |
| 6.312Mb/s | 500 bits | 0.01 | 2.0 microsec |
| 44.736Mb/s | 500 bits | 0.8 | 45 microsec |
| 44.736Mb/s | 500 bits | 0.5 | 11 microsec |
| 44.736Mb/s | 500 bits | 0.25 | 3.9 microsec |
| 44.736Mb/s | 500 bits | 0.1 | 1.4 microsec |
| 44.736Mb/s | 500 bits | 0.01 | 0.28 microsec |
| 274.176Mb/s | 500 bits | 0.8 | 7.3 microsec |
| 274.176Mb/s | 500 bits | 0.5 | 1.8 microsec |
| 274.176Mb/s | 500 bits | 0.25 | 0.63 microsec |
| 274.176Mb/s | 500 bits | 0.1 | 0.23 microsec |
| 274.176Mb/s | 500 bits | 0.01 | 0.047 microsec |
| 1Gb/s | 500 bits | 0.8 | 2.0 microsec |
| 1Gb/s | 500 bits | 0.7 | 1.22 microsec |
| 1Gb/s | 500 bits | 0.6 | 0.75 microsec |
| 1Gb/s | 500 bits | 0.5 | 0.50 microsec |
| 1Gb/s | 500 bits | 0.4 | 0.34 microsec |
| 1Gb/s | 500 bits | 0.3 | 0.21 microsec |
| 1Gb/s | 500 bits | 0.2 | 0.13 microsec |
| 1Gb/s | 500 bits | 0.1 | 0.063 microsec |
| 1Gb/s | 500 bits | 0.01 | 0.013 microsec |

The switching delay is strongly affected by network loading and, as blocking becomes the major factor, delay increases linearly with packet size.

The above table relates to a packet size of 500 bits, which is realistic in a real-time network. A small packet size reduces delays when the packet gets blocked, and makes feasible the implementation of prioritized packet queuing in the switches by ensuring that a real-time packet does not get stuck behind a large data packet whose transmission has already started.

In a standard telephone network, the percentage of customer lines in use at any moment is usually well below 1%.

For the telephone network, it is more useful to look at the situation on individual phone lines. At present, all telephone conversations are converted to a continuous bit stream at 64 kbits/sec. If the telephone network were converted to use the switching above system propose, however, telephone phone conversations would need to be packetized. Packetization offers significant opportunities for data reduction.

The present 64 kb/s data rate was selected 20 or more years ago, and technology has long made this data rate obsolete. However, because of the way in which the phone network was designed, the telephone companies are stuck with this data rate as long as they continue to use circuit switching technology. If the voice signal in a phone conversation were to be packetized, the first saving comes from applying modern compression techniques to the voice signal. The 64 kb/s bit stream can be compressed to 32 kb/s or less without appreciable loss of voice quality, and down to 9600 b/s with some small loss of quality. Compression to 32 kb/s represents a 50% saving, while compression to 16 kb/s represents a 75% saving of bits transmitted. In addition, in voice conversations, it is very unusual for both ends to be talking simultaneously (for any length of time). Since one end of the conversation is normally silent while the other one talks, the silent end can be compressed to a negligible bit rate, thus saving an additional 50% of the data requirement.

Thus, a packetized phone system could expect to produce between 25% and 12% of the current data bits. If the above-described techniques are used to reduce the probability of blocking, the telephone networks can expect a four- to eight-fold increase in capacity.

Potential degradation of performance can occur when the network becomes busy. One means of ameliorating this degradation is to run multiple transmission streams in parallel.

Adopting this approach, the switching element 20b (see FIG. 4) now consists of n×r incoming and outgoing data streams, split into n groups of r data streams each, where all r data streams within a group run between the same points and thus have the same routing codes. The switching algorithm is now modified, since a packet with destination m can be transmitted on any of the r streams within the group. This adds more complexity to the switching hardware to select one of the r N-output streams that is free, but the reduction in data rate gives the hardware proportionately more time to execute the operation.

A switch in which all inputs and outputs are in groups of r parallel data streams is referred to as a balanced parallel switch.

Splitting the paths in this way has a significant effect on the probability that an N-output path will be available, and therefore provides commensurably lower switching delays. The following table shows the probability of not finding a free N-output for different network loading and degrees of parallelism.

| Network Load | 1 stream | 2 ∥ streams | 4 ∥ streams | 8 ∥ streams | 24 ∥ streams |
|---|---|---|---|---|---|
| 0.9 | 0.9 | 0.81 | 0.66 | 0.43 | 0.08 |
| 0.8 | 0.8 | 0.64 | 0.41 | 0.17 | 0.004 |
| 0.7 | 0.7 | 0.49 | 0.24 | 0.058 | $1.9 \times 10^{-4}$ |
| 0.6 | 0.6 | 0.36 | 0.13 | 0.017 | $4.7 \times 10^{-6}$ |
| 0.5 | 0.5 | 0.25 | 0.06 | 0.004 | $6.0 \times 10^{-8}$ |
| 0.4 | 0.4 | 0.16 | 0.026 | $6.6 \times 10^{-4}$ | $2.8 \times 10^{-10}$ |
| 0.3 | 0.3 | 0.09 | 0.008 | $6.6 \times 10^{-5}$ | $2.8 \times 10^{-13}$ |
| 0.2 | 0.2 | 0.04 | 0.002 | $2.6 \times 10^{-6}$ | $1.7 \times 10^{-17}$ |
| 0.1 | 0.1 | 0.01 | $10^{-4}$ | $10^{-8}$ | $10^{-24}$ |

As the table shows, running parallel data streams has a significant effect on the probability of being able to handle all switching at the hardware level.

The table below shows switching times when the switches use 8 and 24 parallel data streams.

As the table shows, with 8 parallel data streams, the design provides very fast switching (close to hardware levels) for loading levels around 50%, and with 24 parallel data streams, the design provides very fast switching for loading levels as high as 80%.

| Transmission Rate (S) | Packet size (b) | Busyness (p) | Prob. of blocking. (8 ∥ streams) | Switching delay (8 ∥ streams) | Prob. of blocking. (24 ∥ streams) | Switching delay (24 ∥ streams) |
|---|---|---|---|---|---|---|
| 64kb/s | 500 bits | 0.8 | 0.17 | 1680 microsec | $4.7 \times 10^{-3}$ | 161 microsec |
| 64kb/s | 500 bits | 0.7 | 0.058 | 596 microsec | $1.9 \times 10^{-4}$ | 126 microsec |
| 64kb/s | 500 bits | 0.6 | 0.017 | 256 microsec | $4.7 \times 10^{-5}$ | 125 microsec |
| 64kb/s | 500 bits | 0.5 | $3.9 \times 10^{-3}$ | 155 microsec | $6.0 \times 10^{-8}$ | 125 microsec |
| 64kb/s | 500 bits | 0.4 | $6.6 \times 10^{-4}$ | 130 microsec | $2.8 \times 10^{-10}$ | 125 microsec |
| 64kb/s | 500 bits | 0.3 | $6.6 \times 10^{-5}$ | 126 microsec | $2.8 \times 10^{-13}$ | 125 microsec |
| 64kb/s | 500 bits | 0.2 | $2.6 \times 10^{-6}$ | 125 microsec | $1.7 \times 10^{-17}$ | 125 microsec |
| 64kb/s | 500 bits | 0.1 | $10^{-8}$ | 125 microsec | $10^{-24}$ | 125 microsec |
| 1.544Mb/s | 500 bits | 0.8 | 0.17 | 69.6 microsec | $4.7 \times 10^{-3}$ | 6.69 microsec |
| 1.544Mb/s | 500 bits | 0.7 | 0.058 | 24.7 microsec | $1.9 \times 10^{-4}$ | 5.24 microsec |
| 1.544Mb/s | 500 bits | 0.6 | 0.017 | 10.6 microsec | $4.7 \times 10^{-5}$ | 5.18 microsec |
| 1.544Mb/s | 500 bits | 0.5 | $3.9 \times 10^{-3}$ | 6.43 microsec | $6.0 \times 10^{-8}$ | 5.18 microsec |
| 1.544Mb/s | 500 bits | 0.4 | $6.6 \times 10^{-4}$ | 5.39 microsec | $2.8 \times 10^{-10}$ | 5.18 microsec |
| 1.544Mb/s | 500 bits | 0.3 | $6.6 \times 10^{-5}$ | 5.20 microsec | $2.8 \times 10^{-13}$ | 5.18 microsec |
| 1.544Mb/s | 500 bits | 0.2 | $2.6 \times 10^{-6}$ | 5.18 microsec | $1.7 \times 10^{-17}$ | 5.18 microsec |
| 1.544Mb/s | 500 bits | 0.1 | $10^{-8}$ | 5.18 microsec | $10^{-24}$ | 5.18 microsec |
| 6.312Mb/s | 500 bits | 0.8 | 0.17 | 17.0 microsec | $4.7 \times 10^{-3}$ | 1.64 microsec |
| 6.312Mb/s | 500 bits | 0.7 | 0.058 | 6.04 microsec | $1.9 \times 10^{-4}$ | 1.28 microsec |
| 6.312Mb/s | 500 bits | 0.6 | 0.017 | 2.60 microsec | $4.7 \times 10^{-5}$ | 1.27 microsec |
| 6.312Mb/s | 500 bits | 0.5 | $3.9 \times 10^{-3}$ | 1.57 microsec | $6.0 \times 10^{-8}$ | 1.27 microsec |
| 6.312Mb/s | 500 bits | 0.4 | $6.6 \times 10^{-4}$ | 1.32 microsec | $2.8 \times 10^{-10}$ | 1.27 microsec |
| 6.312Mb/s | 500 bits | 0.3 | $6.6 \times 10^{-5}$ | 1.27 microsec | $2.8 \times 10^{-13}$ | 1.27 microsec |
| 6.312Mb/s | 500 bits | 0.2 | $2.6 \times 10^{-6}$ | 1.27 microsec | $1.7 \times 10^{-17}$ | 1.27 microsec |
| 6.312Mb/s | 500 bits | 0.1 | $10^{-8}$ | 1.27 microsec | $10^{-24}$ | 1.27 microsec |
| 44.736Mb/s | 500 bits | 0.8 | 0.17 | 2.40 microsec | $4.7 \times 10^{-3}$ | 0.231 microsec |
| 44.736Mb/s | 500 bits | 0.7 | 0.058 | 0.852 microsec | $1.9 \times 10^{-4}$ | 0.181 microsec |
| 44.736Mb/s | 500 bits | 0.6 | 0.017 | 0.367 microsec | $4.7 \times 10^{-5}$ | 0.179 microsec |
| 44.736Mb/s | 500 bits | 0.5 | $3.9 \times 10^{-3}$ | 0.222 microsec | $6.0 \times 10^{-8}$ | 0.179 microsec |
| 44.736Mb/s | 500 bits | 0.4 | $6.6 \times 10^{-4}$ | 0.186 microsec | $2.8 \times 10^{-10}$ | 0.179 microsec |
| 44.736Mb/s | 500 bits | 0.3 | $6.6 \times 10^{-5}$ | 0.180 microsec | $2.8 \times 10^{-13}$ | 0.179 microsec |
| 44.736Mb/s | 500 bits | 0.2 | $2.6 \times 10^{-6}$ | 0.179 microsec | $1.7 \times 10^{-17}$ | 0.179 microsec |
| 44.736Mb/s | 500 bits | 0.1 | $10^{-8}$ | 0.179 microsec | $10^{-24}$ | 0.179 microsec |

A switching element need not be balanced to operate effectively. For instance unbalanced switches can provide excellent switching performance for connections to customer equipment.

An unbalanced switch can be used to connect groups of customers to a balanced parallel switching system. In a telephony environment, such a system might consist of a single group of 24 parallel data streams to and from the switching network, and a number n (where n might be larger than 24) of single streams to individual customers. Since the single streams only go to customer premises equipment (CPE), and this equipment will be responsible for initiating and accepting logical connections (using the protocol levels above this design), the CPE will be able to control the volume of traffic on its stream so as not to overload the stream. The parallel streams to the network then provide an interface into a parallel network with low blocking probability.

In some cases, it may be preferable to implement the routing system in a fixed format rather than using the variable length strings of routelets at the start and end of the packet. A fixed format implementation is possible provided only that there is a network-wide maximum number of routelets that can appear in a routing code. Let us suppose that in our network implementation a routing string can contain at most 'n' routelets.

In practice, 'n' can be determined for any network. In a well structured network, 'n' will be reasonably small. Thus, the only effect of a fixed format implementation may be to constrain possible future expansion of the network.

Figure 11:
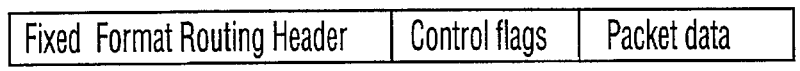
FIG. 11 shows a fixed format packet structure.

In the fixed format implementation, the routing header of FIG. 3 is replaced by the routing header of FIG. 11, which has a fixed length section of n+2.

Figure 12:
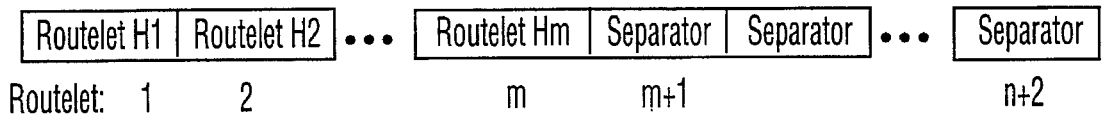
FIG. 12 shows a fixed format routing header.

The fixed format routing header consists of n+2 routelets. If the initial routing code at entry to the network consists of m (<n) routelets. The fixed format header is shown in FIG. 12.

Figure 13:
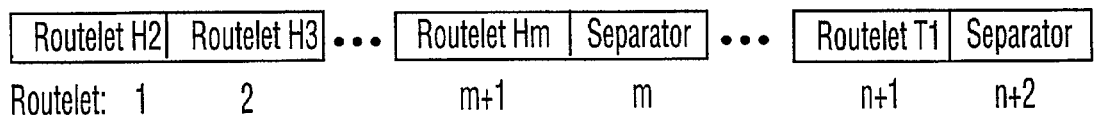
FIG. 13 shows a fixed format routing header after first switch transmission.

Since the maximum number of routelets in the routing string is n, there will be at least 2 separators terminating the string. As the packet is routed through each switch, the initial routelet is removed and the first n+1 routelets are shifted forward 1 place. The inbound path routelet is inserted at position n+1. Thus, after the first switch, the fixed format header has the appearance shown in FIG. 13.

Figure 14:
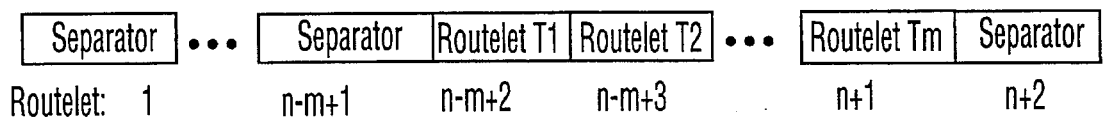
FIG. 14 shows the fixed format network header at routing exit.

Thus, as the packet proceeds through the network, routelets are stripped from the first position and used to route the packet through each switch, in exactly the same manner as in the original algorithm. The next n routelets are shifted forward 1 position and the inbound path number is placed in the n+1'th routelet position. The final separator is retained to validate the end of the routelet string. When the packet exits the network (assuming no errors), the fixed header contains the return path in routelets n−m+2 to n+1, as shown in FIG. 14.

Thus, at exit from the network, the return path can be extracted from the fixed header by starting at routelet n+1 and working backwards until a separator is encountered. Apart from the fact that the return path is stored in the fixed header instead of at the end of the packet, this is exactly the same algorithm as in the original design. Thus, all capabilities of the general design are preserved.

The possibility of prioritizing the processor's retransmission queues so that real-time data can be given priority over non real-time data has been mentioned. The converse of this strategy is to drop real-time packets that have been delayed long enough that there is no point in delivering them. This can improve performance in a network that is severely overloaded. One method of achieving this is to include a 'delay counter' value in the packer's control field. Each time the packet passes through a network processor, the processor increments the delay field by a number of 'delay units' which are proportional to the length of time the packet is queued for transmission. If the delay units exceed a threshold value, the packet can be discarded.

The delay threshold can be implemented as a network constant, or can be encoded in the control field for each packet transmitted. The latter strategy increases packet overhead but allows each customer to specify a threshold specific to his application.

Thus, in a network in which real-time transmission is the overriding imperative the network processor algorithm can be modified to discard packets, as in the frame relay technology. This ensures that all surviving packets are switched at close to hardware speed.

The invention enables a network employing the technology to perform dynamic local load balancing.

Suppose a section of the network, such as the link between switches A and B in FIG. 15, is busy compared to adjacent links. With the system of routelets, it is a simple matter to implement dynamic routing to distribute traffic through alternate paths and, since the system is connectionless, the local routing decisions can be made by the local switches and need not involve the rest of the network.

For example, whenever the switch A processor receives a blocked packet destined for switch B and there is already a packet in the output queued for switch B, switch A can make a minor adjustment to the routelet string for the new packet and transmit it to switch B via switch C or switch D (choosing one with an empty queue). This is trivial to implement and requires just a knowledge of local connections. Extending the algorithm a little further, if switch A determines that the packet is routed to switch E after switch B, it can route the packet to E via D, bypassing switch B altogether.

If the switches' network management subsystem is allowed to communicate with adjacent switches, switch A can maintain information on the network load on the links beyond its adjacent switches. Thus, it knows the (recent) loading on the link between C and B, the link between D and B, and the link between D and E, before it makes a re-routing decision. Switch A can therefore make its re-routing decision with reasonable assurance that it is not just shifting the overload problem to another link further down the line.

Although the processor of switch A only sees packets that are blocked, these packets will normally provide a good statistical sample of the total set of packets passing through the switch. If the processor determines that much of the overloading traffic is coming from switch F, it can request switch F to perform local re-routing to further distribute the traffic over a wider area.

The invention also enables the implementation of dynamic macro routing capabilities. Assume that a switch receives a blocked packet that must be re-routed over a larger area than the micro-routing can handle, and/or that all later packets need to be re-routed in the data stream. There could be several reasons for wanting to do this—an area of high traffic, a dead switch, etc. Assume that determination of the need is part of the network management system and is beyond the scope of this design.

The switching node has received a packet and wishes to re-route future packets from the same source. The packet is part way through the network and the routing header and trailer strings have the appearance shown in FIG. 16.

Note that in a blocked packet, the routing strings have not yet been processed for this switch, so the first routelet in the header represents the requested output path from this switch. The t routelets Hm .. H(m+t−1) are to be replaced with s new routelets Hm .. H(m+s−1). A control message is generated to the packet source (using the trailer routelets) and the routelet replacement indicated with a packet data area as shown in FIG. 17.

On receiving this message, the CPE unit searches all its routing strings and changes all strings which match the old routelet string starting at position m for t routelets by removing the t old routelets and replacing them with the s new routelets. All connections that used the old path are now converted to use the new path.

In order to perform this re-routing, the packet must be intercepted at or before the point where the routing is to be changed.

The potential for user-friendly naming strategies and the manner in which a routing string is obtained by a customer of the network has been described above.

A hierarchical naming scheme can be implemented in such a way that knowledge of the physical organization of the network can be localized.

Any hierarchical name management system will also require a hierarchical name structure. In the following description, it will be assumed that such a name structure is present. The details are not relevant to the route resolution algorithm.

A hierarchical name management system can be organized in much the same way as the traditional PSTNs. The network into geographic areas and a name management switch assigned to perform routing for connections that are contained within such an area. These areas are called 'level 1' areas. Groups of level 1 areas are collected into level 2 areas, and a name management switch is assigned to perform routing between the level 1 areas in its group. Similarly, groups of level 2 areas are collected into level 3 areas, and a name management switch is assigned to perform routing between the level 2 areas in its group. The process continues until the whole network is covered.

The level 1 name management switch only needs to understand how to route calls within its area, and how to communicate with its assigned level 2 name management switch. Similarly, the level 2 name management switch only needs to understand how to route calls between the level 1 switches assigned to it and how to communicate with its level 3 switch, and so on. Note that the name management switches in level 2 and above do not know how to route packets within the areas of the lower levels—they just need to know how to route packets between the name management switches at the level below them.

The algorithm for generating a routing string is as follows:

The customer equipment issues a request for a routing string, which gets passed to the level 1 name management switch for its area. If the level 1 name management can fully satisfy the routing request (i.e. if the destination is also within its area), it will return the routing string to the customer. Otherwise, it uses the routing trailer and its knowledge of its area to compute the forward path from the customer to itself and then adds the path to its assigned level 2 name management switch. It passes this information and the routing request to its assigned level 2 name management switch, complete with the routing trailer that describes the path back to the customer equipment. Thus, when the request arrives at the level 2 switch its routing trailer contains a path from the customer to the level 2 switch, and a complete path back to the customer is contained in the routing trailer.

Now, if the level 2 switch can handle the name resolution, it determines which level 1 name management switch contains the destination in its area, adds the path to that switch to its forward path, and routes the request to that level 1 name management switch. Again routelets are appended to the packet as it goes. Thus, when the request arrives at the level 1 switch its routing trailer again contains a path from the customer to the level 1 switch, and a complete path back to the customer is contained in the routing trailer. The level 1 name management switch now has the ability to provide routing to the destination. It therefore adds this information to the forward path and uses the routing trailer to return the routing string to the customer.

If the level 2 switch cannot handle the name resolution, it passes the packet to its assigned level 3 name management switch where the algorithm is repeated.

Thus, this hierarchical algorithm permits knowledge of the network structure to be partitioned among the name management nodes of the system. Local changes can be made to the network organization without impacting the whole set of name management nodes in the network.

A method for incorporating the present invention into a PSTN will now be described. While several approaches are possible, the one described here can be implemented in stages and with minimal disruption to the existing network.

The end result of the conversion is to replace the current circuit switched network with a real-time packet switched network with four to eight times the capacity of the current network, leaving the present transmission facilities intact and replacing the switches. Clearly, this is not a trivial conversion and will take place over many years. However, the benefits of conversion are significant:

An increase in capacity of the existing transmission system, enabling it to handle four to eight times the current volume of voice traffic.

The ability to offer fast packet switched real-time data transmission capabilities.

The ability to offer packet switched video services.

Once converted the PSTN voice services have been converted to packet switching, the data and video services can be added in a variety of ways, using the core real-time packet switching capabilities of the converted network.

Figure 18:
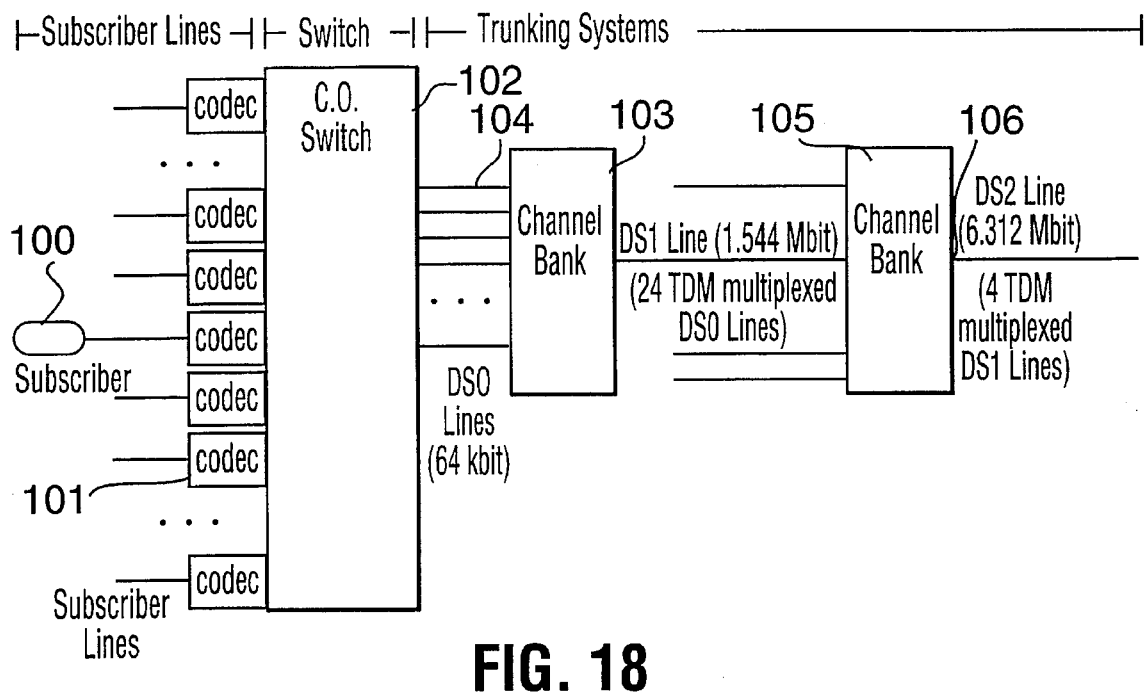
FIG. 18 shows the architecture of a standard PSTN.

In FIG. 18, a subscriber 100 is connected through codec 101 to central office switch 102, which in turn is connected to channel bank 103 via DS0 (64 kbit/sec) lines 104. Channel bank 103 is connected via a DS1 (T1) link to channel bank 105, which outputs a 6.312 Mbit/sec Ds2 line 196.

The Figure shows the stages in transforming a subscriber signal to and from a multiplexed bit-stream in the inter-office or long distance trunking system.

The signal from the subscriber to the local office is analog. (There are digital services such as ISDN and switched 56, but these are a small minority and not growing fast.) At the local office, the codec 101 (COder/DECoder) converts the signal to a continuous digital stream at 64 kbits/sec. (8000 8-bit samples per second). This 64 kbit/sec data stream is called a DS0 signal. The signal is switched according to the call destination at the local office. If the destination is not within the local office, the signal is switched to one of the inter-office trunks and is multiplexed, along with other DS0 signals destined for the next office, onto a DS1 trunk. The DS1 signal consists of 24 DS0 signals which are time-division multiplexed, along with some framing bits, to form a 1.544 Mbit/sec. data stream. Depending on the volume of inter-office traffic, the DS1 signal may be further multiplexed (using the same techniques at higher speed) into a DS2 (6.312 Mbits/sec.), DS3 (44.736 Mbits/sec.), or DS4 (274.176 Mbits/sec.) data stream.

The important point is that the fundamental transmission rate of the network is 64 kbits/sec. (DS0), and these higher data rates just consist of many multiplexed DS0 signals.

The simplest way to convert the system to a packet switched network, then, is to preserve the transmission formats of DS1, DS2, DS3, and DS4, and replace the continuous 64 kbit/sec. DS0 data stream with a 64 kbit/sec. packetized data stream. This preserves the trunking transmission system, which continues to multiplex and demultiplex 64 kbit/sec. signals. The only part of the system that must be replaced is the central offices—the switches.

Figure 19:
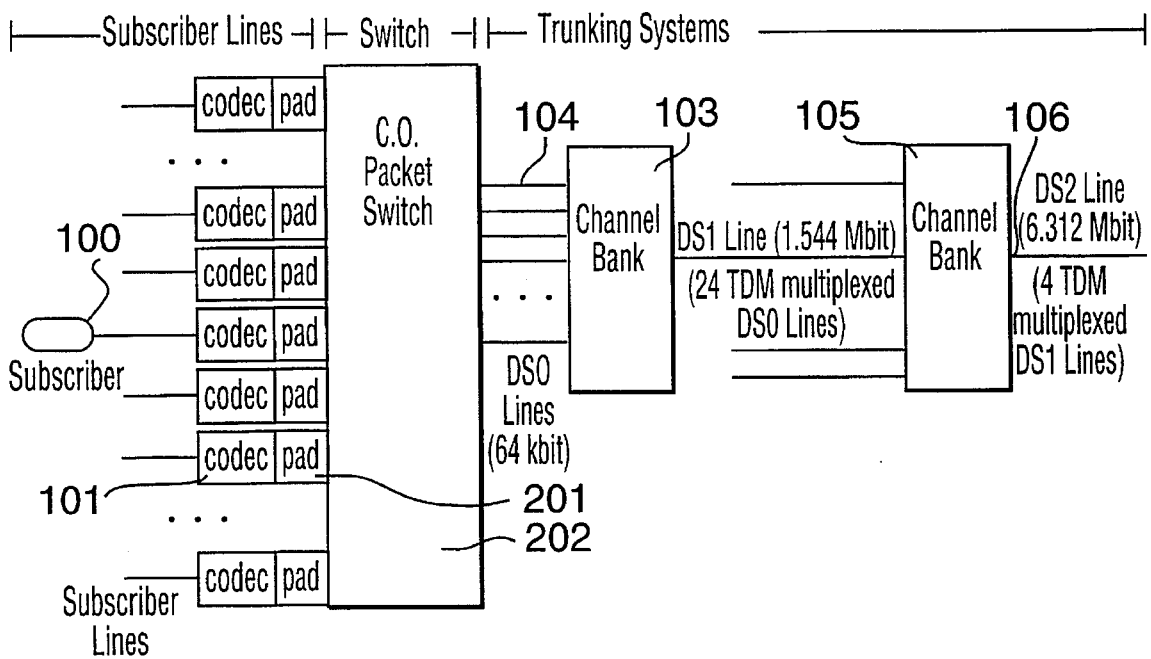
FIG. 19 shows the architecture of a packet-switched network according to the invention.

The architecture of the system after replacing the circuit switches with packet switches is shown in FIG. 19.

The subscriber loop remains the same, as does the trunking system. The only part of the system to change is the C.O. switch 202, and the insertion of pads 201 (PAcketizer/

Depacketizers), which are inserted in each subscriber loop between the C.O. and the codec. (In practice, the codec and pad would probably be combined into a single unit.) The switch is now a packet switch.

The pad 201 converts the 64 kbit/sec. data stream into packets by collecting data from the 64 kbit/sec. stream for a fixed period and then compressing it and wrapping the packet protocol around the compressed data.

At the output of the pad 201, packets are interspersed with flags. Since the packets consist of digitized voice, compressed to 16 or 32 kbits/sec. but still transmitted at 64 kbits/sec., the packets occupy a relatively small proportion of the data stream as shown in FIG. 20.

Figure 20:
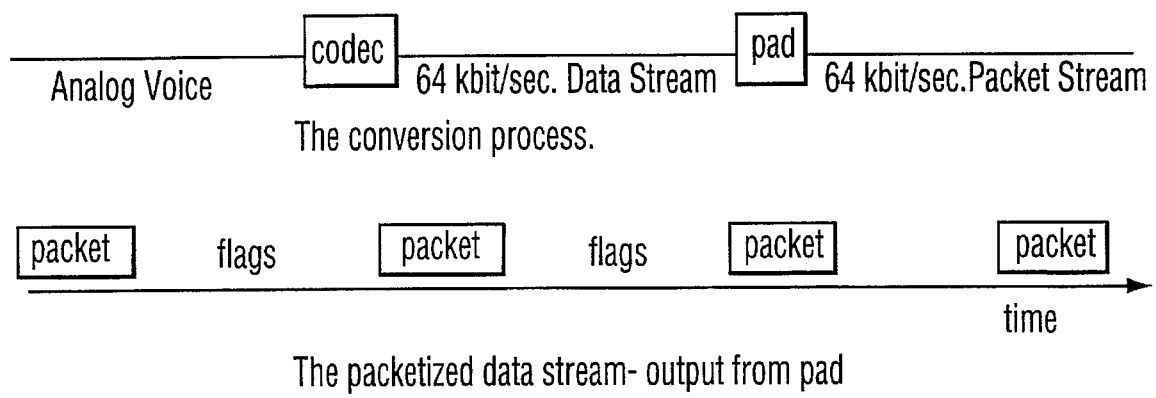
FIG. 20 shows a packetized data stream.
Figure 21:
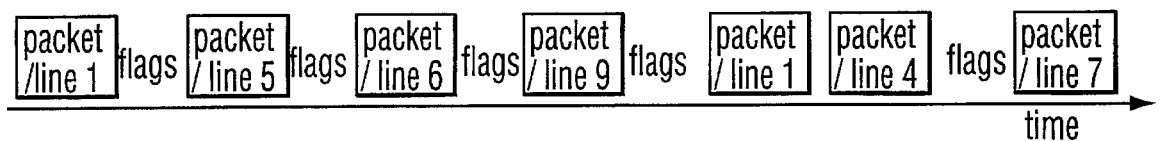
FIG. 21 shows packetized data stream packets multiplexed on a DS0 trunk.

In FIG. 20, all packets originate from the subscriber loop and hold compressed data, and are therefore widely spaced. However, once they have passed through the packet switch, packets from many different subscriber lines will be interleaved on a DS0 stream, thus making better use of the stream bandwidth and freeing up transmission capacity for other uses or more voice lines. FIG. 21 shows such a DS0 stream.

At the other end of a connection, the reverse process takes place. Multiplexed packets on each DS0 trunk are demultiplexed and interleaved on subscriber loops. Because the destination voice loop is receiving only the packets originating from the source voice loop, the packets on the destination loop are again widely spaced and will not overload the loop.

At the destination pad/codec 210, 101, the pad is responsible for checking that the order of the received packets is correct and for stripping the protocol and decompressing the data. The codec then converts the 64 kbit/sec. data stream to an analog signal for the destination telephone. The receiver pad must compensate for packets which are delayed or lost—if a packet has not arrived by the time the previous packet data has been transmitted, the pad must 'interpolate' until the next packet is received.

It must be emphasized that this system is made possible by two characteristics: very fast packet switching and a low probability that a packet will be delayed in a switch. Clearly, the system cannot tolerate large numbers of lost or late packets, so the system design must make sure that this does not happen. On the other hand, the occasional lost packet is tolerable.

To give some idea of packet size: If the data is packetized every 20 millisecs, the raw data will comprise 1280 bits or 160 bytes, which should compress to between 40 and 80 bytes if the caller is talking and to much less if the line is silent. Thus, the typical packet size will probably be around 60 to 70 bytes—comparable to the packet size of ATM (and therefore compatible with ATM). The occasional lost packet will result in 'interpolation' by the pad, which will result in a 20 millisec. 'glitch' The simplest way to interpolate is to replay the last packet received—in many cases this would probably go unnoticed.

In practice, of course, other considerations must be taken into account, for instance, the conversion of the signaling and control subsystem. However, modern network control systems—CCIS and SS7—are already confined to an out-of-band packet switching network, which is totally separate from the voice network. This simplifies the translation and, in fact, permits the re-integration of the signaling and control subsystem with the rest of the network.

An important aspect of the invention is that existing PSTN systems can be gradually converted over to packet switching, a little at a time. The packet switching system can be converted piece by piece, by creating islands of packet switching within the circuit switched PSTN and gradually expanding the islands. Such a system is illustrated in FIG. 22.

Figure 22:
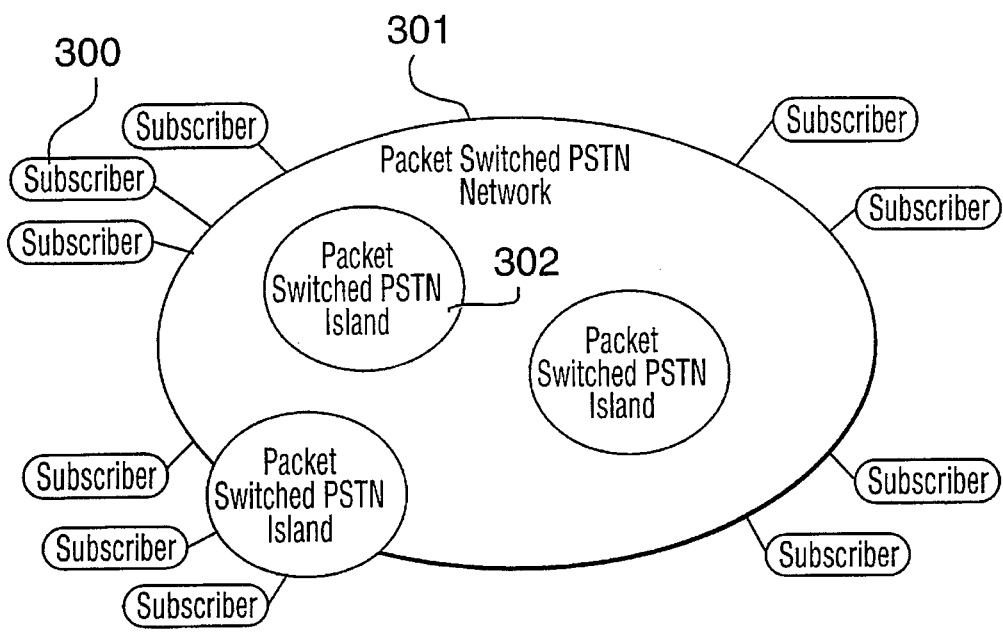
FIG. 22 shows a mixed PSTN network in the process of conversion to packet switching.

In FIG. 22, subscribers 300 are connected to circuit switched network 301 which contains islands of packet switched networks 302.

Figure 23:
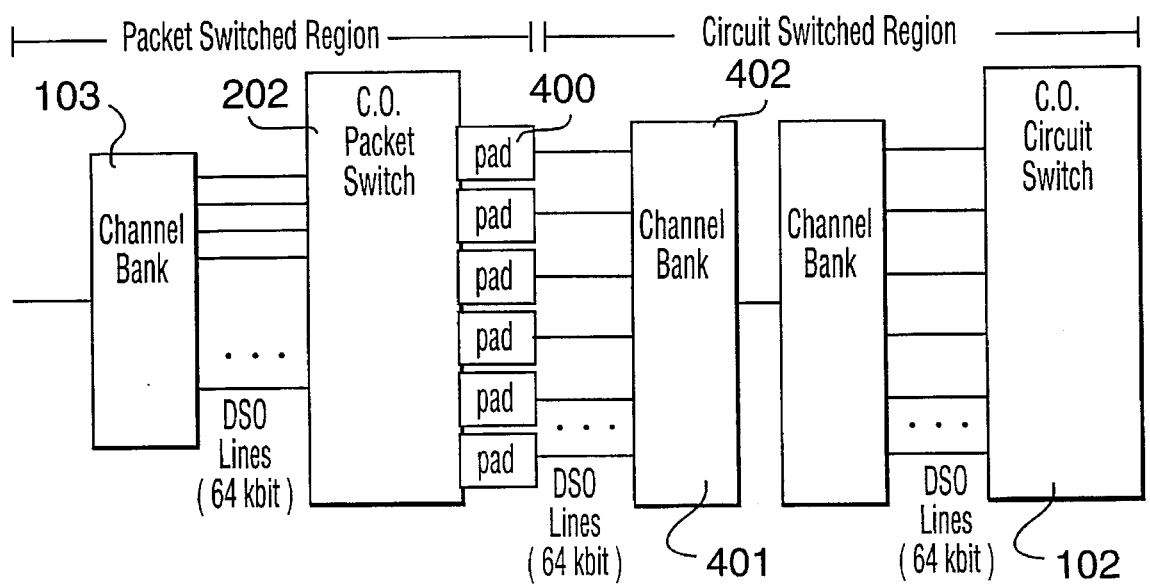
FIG. 23 shows the packet-switched/circuit interface for the network in FIG. 23.

FIG. 23 shows the configuration at the interface between the circuit switched and packet switched areas. Channel bank 103 is connected to packet switch 202, which is connected through channel banks 401, 402 to circuit switch 102. Pads 400 are inserted at the interface to convert between packets and continuous data streams. As switches are converted, the packet switching islands expand and the circuit switching areas decrease.

Subscribers connected to circuit switched local offices interface to the network as in FIG. 22; subscribers connected to packet switched local offices interface to the network as in FIG. 23.

The above description represents only one of many possible ways in which the PSTN can be converted to packet switching technology. Other options include:

Increasing the base transmission speed above 64 kbits/sec. For instance, increasing the base rate to DS1 (1.544 Mbits/sec.) would make the implementation of video services much easier (this is currently the lowest speed at which reasonable quality full motion video can be transmitted), but would require significant conversions for voice data and at the boundaries between packet switched and circuit switched sections of a mixed network. A DS1 base rate would also enable switched high speed inter-computer traffic. Both considerations may lead to great benefits in the long term, but would add to the cost and complexity of the conversion process.

A mixed speed network is possible, (e.g. DS0 and DS1) using multiple bit-rate transmissions operating in parallel with separate switching elements and minimal interaction. Again there are advantages for video and data, but there would appear to be a considerable disadvantage in the difficulty of sharing capacity between sections of the network operating at different speeds.

The conversion to packet switching will open up significant free capacity to additional voice traffic and to other applications.

Packet switched network is much more friendly to data than the current network.

The invention can be applied to ATM networks with minor modifications. The standard 53 byte ATM 'cell' must be expanded to include a fixed size switching prefix. If the ATM cell is processed entirely in software, which is the case in almost all current ATM implementations, relatively simple software changes are all that are required.

Where up-coming technologies process the ATM cell in firmware or in hardware, the firmware/hardware requires modification to accommodate the new expanded 'cell' structure. Where ATM switches are concerned, the changes are accompanied by significant simplification and ease of configuration.

The invention is also applicable to Frame Relay. Since Frame Relay does not use a fixed sized 'cell', Frame Relay can use either the fixed-length or the more flexible variable-length routing strings. In either case, the routing strings can be wrapped around the Frame Relay packet. The wrapper can be applied as the packet enters the switched network, and stripped as it exits the network. Thus, the network would be invisible to the Frame Relay endpoints, which would see only point-to point links.

Application to X.25 is similar to Frame Relay. In effect it removes the network complexity and leaves X.25 to manage the links to and from the network.

I claim:

1. A data transmission network comprising:
   a) a plurality of packet switching nodes distributed throughout the network for transmitting data packets between a data source and destination;
   b) means for receiving incoming data and identifying the destination thereof;
   c) means for identifying a path through the network to said destination;
   d) means for assembling incoming data into packets and including in said packets a plurality of routing codes respectively defining the path through successive switches in the network;
   e) switching means in said packet switching nodes for interpreting said routing codes in incoming packets, said switching means having network inputs and network outputs and processor inputs and processor outputs corresponding respectively to said network inputs and said network outputs, said switching means routing said incoming packets to a designated said network output in accordance with said routing codes if a valid routing code is interpreted and said designated output is available and otherwise diverting said incoming packets to a corresponding processor input; and
   f) a processor in said packet switching nodes connected to said processor inputs and processor outputs of said switching means, said processor receiving said diverted packets over said processor inputs and temporarily storing said diverted packets, said processor sending the diverted packets with a valid routing code back to the network over said processor outputs when the designated network output becomes available.

2. A data transmission network as claimed in claim 1, wherein said switching nodes comprise means for successively stripping used routing codes from the packets as they flow through the network so that the first routing code in the packet always defines the outward path from the next switch node.

3. A data transmission network as claimed in claim 2, wherein said packets comprise a routing header field and a routing trailer field, said routing codes are included in said routing header field, and said switching nodes comprise means to insert further routing codes in said routing trailer field, said routing trailer codes in the trailer field identifying the path taken by the packets, whereby as the packets flow through the network the routing header and routing trailer fields are dynamically changed to indicate respectively the path to be taken and the path traversed of each packet.

4. A data transmission network as claimed in claim 3, wherein said packets contain a separator after the routing trailer and before the routing trailer.

5. A data transmission network as claimed in claim 4, wherein switching means diverts incoming packets to said processor if a said separator is encountered.

6. A data transmission network as claimed in claim 5, wherein said packets also contain control flags to indicate whether they contain user data or network management data, and said processor examines said control flags of packets diverted due an encountered separator, and if said processor determines that the incoming packet contains user data it discards it, and if said processor determines that the incoming packet contains network management data, it decodes the data and acts on it accordingly.

7. A data transmission network as claimed in claim 1, wherein a group of r of said plurality of inputs and outputs are allocated in each switching node to each said routing code, said r inputs and outputs thereby providing parallel channels for said packets through the network.

8. A data transmission network as claimed in claim 5, wherein said switching means comprise at least one hardware-implemented switch matrix unit connected to said network inputs and outputs via respective packet reception and transmission units, and to said processor inputs and outputs via packet-to-processor units and packet-from-processor units respectively.

9. A data transmission network as claimed in claim 8, wherein said packet-to-processor units comprise a data memory, a control unit for identifying the start and end of a packet, a processor interface, and an end-of-packet interrupt output.

10. A data transmission network as claimed in claim 8, wherein said packet-from-processor units comprise a data memory, a control unit for identifying the initial routing code and end of a packet, a processor interface, and an start-of-packet interrupt output.

11. A data transmission network as claimed in claim 8, wherein said switch matrix unit comprises a switch matrix with inputs and outputs, and a switch matrix controller controlling said switch matrix.

12. A data transmission network as claimed in claim 11, wherein said switch matrix controller comprises an interface logic unit and a port assignment array.

13. A data transmission network as claimed in claim 1, wherein said switching means comprise at least one hardware-implemented switch matrix connected to said inputs and outputs via respective packet reception and transmission units.

14. A data transmission network as claimed in claim 13, wherein said packet reception units comprise a de-framer, a byte accumulator, and a scanner for identifying bytes in the received packets.

15. A data transmission network as claimed in claim 13, wherein said packet transmission units comprise a FIFO memory, a byte serializer, and a framer.

16. A method of transmitting data over a network comprising the steps of:
   a) receiving incoming data and identifying the destination thereof;
   c) identifying a path through the network to said destination;
   d) assembling incoming data into packets and including in said packets a plurality of routing codes defining the path through successive respective switching nodes in the network;
   e) interpreting said routing codes in the incoming packets at each node in the network; and
   f) if the interpreted routing codes are valid and a network output designated thereby is available, sending said packets to the designated output, and otherwise diverting said packets to a processor over a processor input corresponding to a network input over which the packets arrived, said processor sending the diverted packets with a valid routing code back to the network over processor outputs corresponding to when the designated network output becomes available.

17. A method as claimed in claim 16, wherein used routing codes are stripped from the packets as they flow through the network so that the first routing code in the packet always defines the outward path from the next switch node.

18. A method as claimed in claim 17, wherein said packets comprise a routing header field and a routing trailer field, said routing codes are included in said routing header field, and further routing codes identifying the path taken by the packets are inserted in said routing trailer field as the packets flow through the network, the routing header and routing trailer fields thereby being dynamically changed to indicate respectively the path to be taken and the path traversed of each packet.

19. A method as claimed in claim 18, wherein said packets contain a separator after the routing trailer and before the routing trailer.

20. A method as claimed in claim 19, wherein incoming packets are also diverted to said processor if a said separator is encountered.

21. A method as claimed in claim 20, wherein said packets also contain control flags to indicate whether they contain user data or network management data, and said processor examines said control flags of packets diverted due an encountered separator, and if said processor determines that the incoming packet contains user data it discards it, and if said processor determines that the incoming packet contains network management data, it decodes the data and acts on it accordingly.

22. A method as claimed in claim 16, wherein a group of r of said plurality of inputs and outputs are allocated in each switching node to each said routing code, said r inputs and outputs thereby providing parallel channels for said packets through the network.

\* \* \* \* \*